(12) United States Patent
Jayakody et al.

(10) Patent No.: US 9,443,038 B2
(45) Date of Patent: *Sep. 13, 2016

(54) METHOD AND SYSTEM FOR TAG SUGGESTION IN A TAG-ASSOCIATED DATA-OBJECT STORAGE SYSTEM

(75) Inventors: Prasantha Jayakody, Seattle, WA (US); Linh Dinh Tran, Shoreline, WA (US); Jiaxin Wang, Redmond, WA (US)

(73) Assignee: Vulcan Technologies LLC, Seattle, WA (US)

( * ) Notice: Subject to any disclaimer, the term of this patent is extended or adjusted under 35 U.S.C. 154(b) by 731 days.

This patent is subject to a terminal disclaimer.

(21) Appl. No.: 13/286,720

(22) Filed: Nov. 1, 2011

(65) Prior Publication Data

US 2012/0109982 A1  May 3, 2012

Related U.S. Application Data

(63) Continuation of application No. 12/511,007, filed on Jul. 28, 2009, now Pat. No. 8,176,072.

(51) Int. Cl.
*G06F 17/30* (2006.01)

(52) U.S. Cl.
CPC .............. *G06F 17/30997* (2013.01)

(58) Field of Classification Search
USPC .................................. 707/769, 805
See application file for complete search history.

(56) References Cited

U.S. PATENT DOCUMENTS

| | | | | |
|---|---|---|---|---|
| 5,920,859 A * | 7/1999 | Li | G06F 17/3061 | 707/711 |
| 6,643,639 B2 * | 11/2003 | Biebesheimer | G06F 17/30867 | 707/709 |
| 6,820,075 B2 * | 11/2004 | Shanahan | G06F 17/3064 | 707/769 |
| 6,853,998 B2 * | 2/2005 | Biebesheimer | G06F 17/30528 | 707/765 |
| 7,080,083 B2 * | 7/2006 | Kim | G06F 17/218 | 707/797 |
| 7,200,599 B2 * | 4/2007 | Simon | G06F 21/316 | 707/754 |
| 7,251,648 B2 * | 7/2007 | Chaudhuri | G06F 17/3053 | 707/749 |
| 7,257,570 B2 * | 8/2007 | Riise | G06F 17/3087 | 707/706 |
| 7,328,204 B2 * | 2/2008 | Coady | G06F 17/30684 | 707/748 |
| 7,337,180 B2 * | 2/2008 | Spriestersbach | G06F 3/0482 | 707/805 |
| 7,483,892 B1 * | 1/2009 | Sommer et al. | | |
| 2008/0091549 A1 * | 4/2008 | Chang | G06Q 30/02 | 705/14.66 |
| 2009/0254540 A1 * | 10/2009 | Musgrove | G06F 17/30613 | |
| 2011/0010388 A1 * | 1/2011 | MacLaurin | | 707/769 |

\* cited by examiner

*Primary Examiner* — Kim Nguyen
(74) *Attorney, Agent, or Firm* — Olympic Patent Works PLLC

(57) ABSTRACT

Embodiments of the present invention are directed to facilitating tag assignment to data objects as data objects are added to a tag-associated data-object storage system by users of the tag-associated data-object storage system and to facilitate subsequent display, access, and further characterization of data objects that already reside in the a tag-associated data-object storage system. Methods and systems of the present invention provide for automated tag suggestion to users in order to both increase usability of the interface provided to the tag-associated data-object storage systems as well as decrease the likelihood of unnecessary and unproductive tag proliferation within the tag-associated data-object storage system.

8 Claims, 29 Drawing Sheets

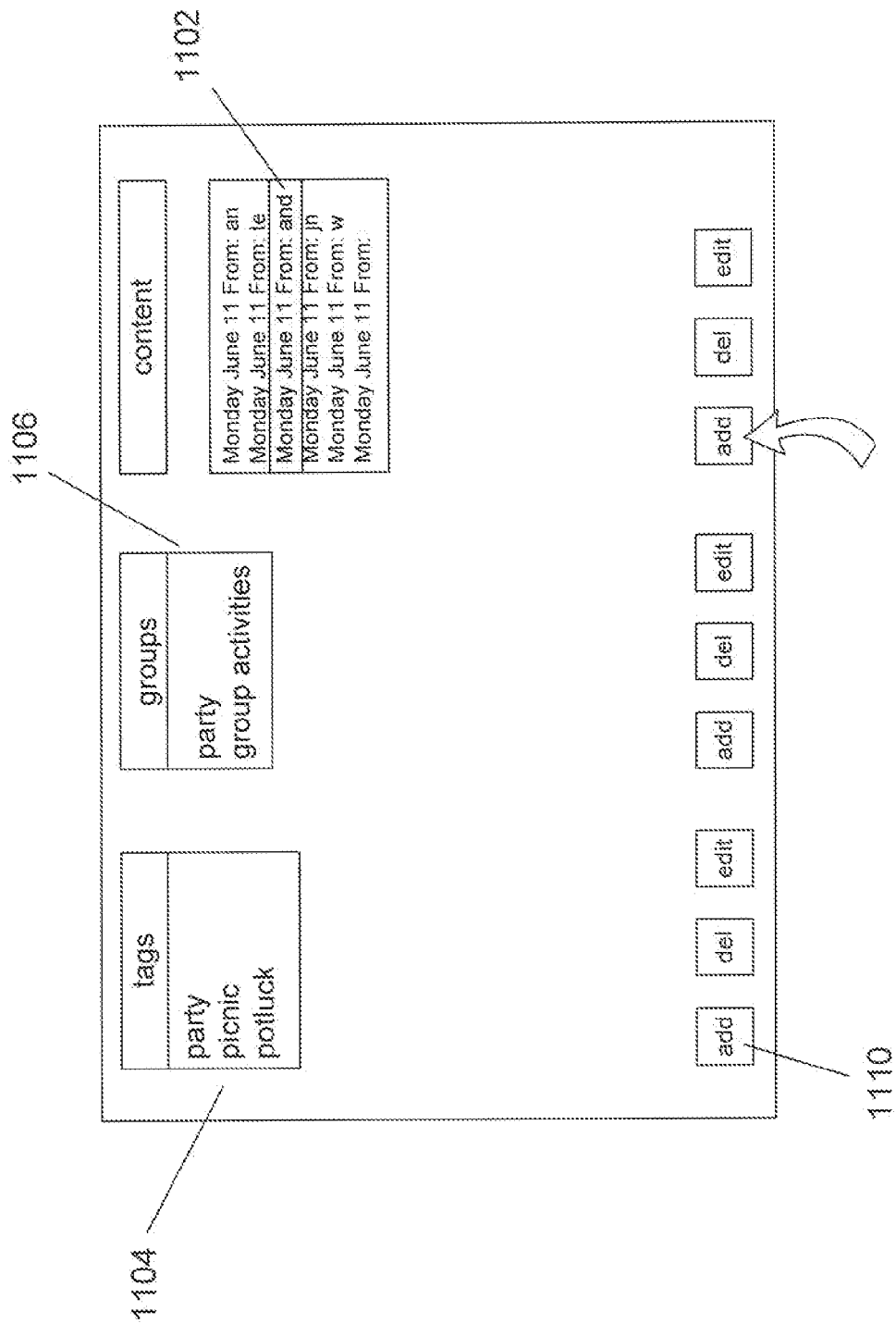

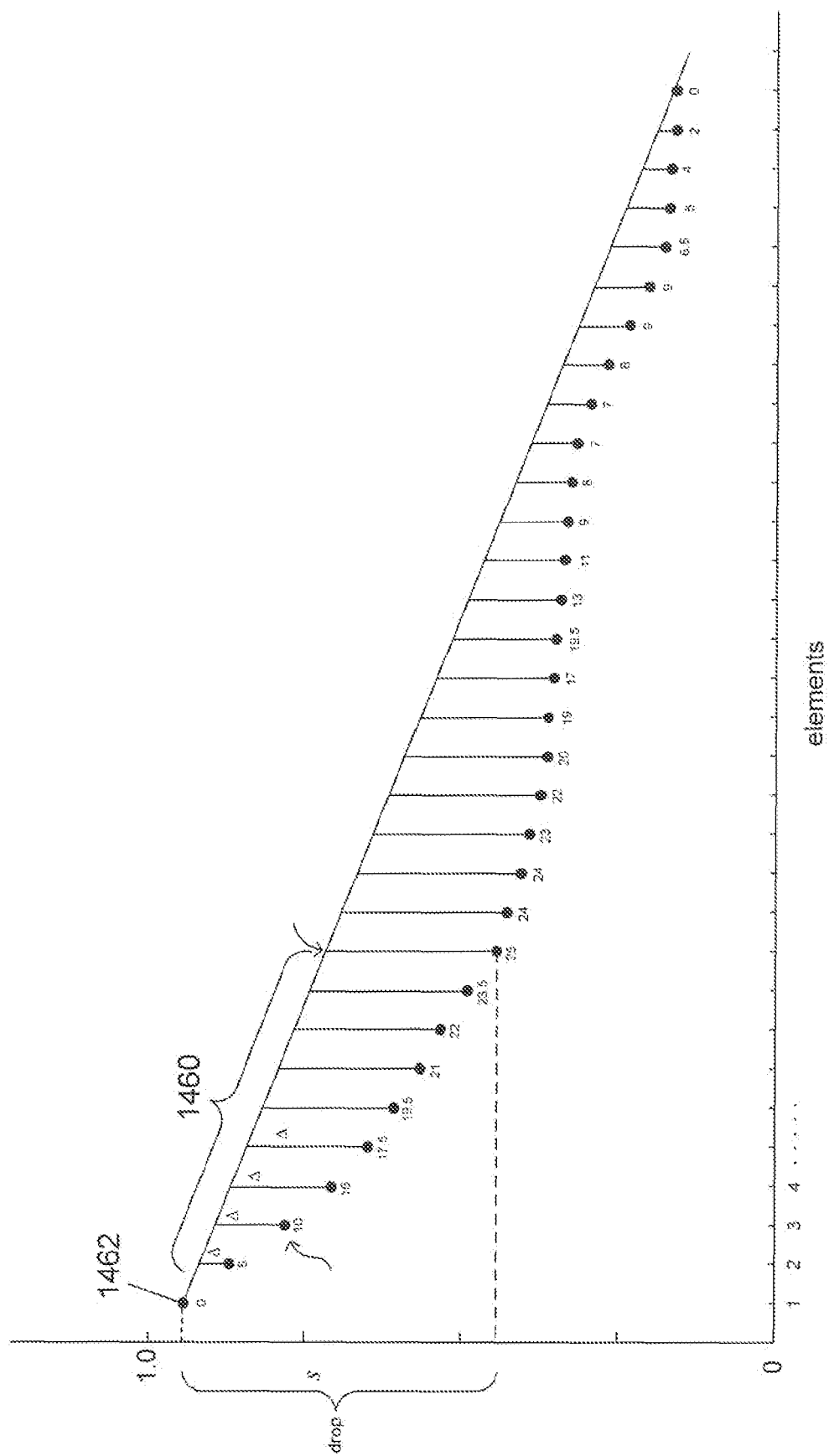

METHOD AND SYSTEM FOR TAG SUGGESTION IN A TAG-ASSOCIATED DATA-OBJECT STORAGE SYSTEM

CROSS-REFERENCE TO RELATED APPLICATION

This application is a continuation of application Ser. No. 12/511,007, filed Jul. 28, 2009 now U.S. Pat. No. 8,176,072.

TECHNICAL FIELD

The present invention is related to data-storage systems and, in particular, to a tag-suggestion method and system that provides a concise list of candidate tags most likely to be associated with a data object that is to be stored in a tag-associated data-object storage system.

BACKGROUND OF THE INVENTION

Computer hardware, computer operating systems, and computer networking systems have evolved at tremendous rates during the past 50 years. Electronic data-storage systems have evolved at similar rates, become increasingly robust, capable, and useful and providing ever increasing data-storage capacities. Initially, electronic data was stored on Hollerith cards, on magnetic tape, and, subsequently, on removable disk packs, and was generally loaded, at run time, for use by stand-alone software programs running on stand-alone computer systems. Currently, vast amounts of data are now routinely stored in networked computer systems and specialized data-storage systems, available for concurrent access by myriads of local and remote users. Data can be easily replicated across mass-storage devices and systems for high reliability and high availability and can be managed and accessed through various feature-rich interfaces provided by database management systems and distributed file systems. However, along with at least geometrical growth in data-storage capacities, accessibility, and robustness, the complexities of both file systems and database management systems, including the complexity of configuring and managing such systems, have also grown.

Recently, a new type of data-object storage system has been developed in order to simplify data-object storage and retrieval. Rather than relying on predefined database schemas and elaborate user interfaces, relying on configuring complex hierarchical distributed file-system structures, or configuring and managing distributed reversion-control systems, certain of these new, simplified data-object storage systems allow data objects to be associated with tags, or attributes, by users of the systems, stored in the data-object storage systems in association with the tags, and subsequently recovered from the data-object storage systems by specifying one or more tags. While the simplified interface provided by this new class of data-object storage systems provides welcome increases in usability and flexibility to users of the data-object storage systems, new design challenges are frequently encountered. Therefore, developers, vendors, and users of simplified, tag-associated data-object storage systems continually seek new methods and techniques for improving current functionality and for adding new functionality to these simplified data-object storage systems.

SUMMARY OF THE INVENTION

Embodiments of the present invention are directed to facilitating tag assignment to data objects as data objects are added to a tag-associated data-object storage system by users of the tag-associated data-object storage system and to facilitate subsequent display, access, and further characterization of data objects that already reside in the a tag-associated data-object storage system. Methods and systems of the present invention provide for automated tag suggestion to users in order to both increase usability of the interface provided to the tag-associated data-object storage systems as well as decrease the likelihood of unnecessary and unproductive tag proliferation within the tag-associated data-object storage system.

BRIEF DESCRIPTION OF THE DRAWINGS

FIG. 11 illustrates ramifications of the principles of embodiments of the present invention at a user-interface level.

FIGS. 14A-F illustrate, using graphs of discrete functions, a technique for selecting candidate tags for a data object according to one embodiment of the present invention.

DETAILED DESCRIPTION OF THE INVENTION

Embodiments of the present invention are directed to a method and system for automated tag, or attribute, suggestion in a tag-associated data-object storage system. In the initial portions of the following discussion, tag-associated data-object storage systems are introduced and characterized, to provide a context for subsequent discussion of problems addressed by various embodiments of the present invention as well as the various embodiments of the present invention.

Figure 1:
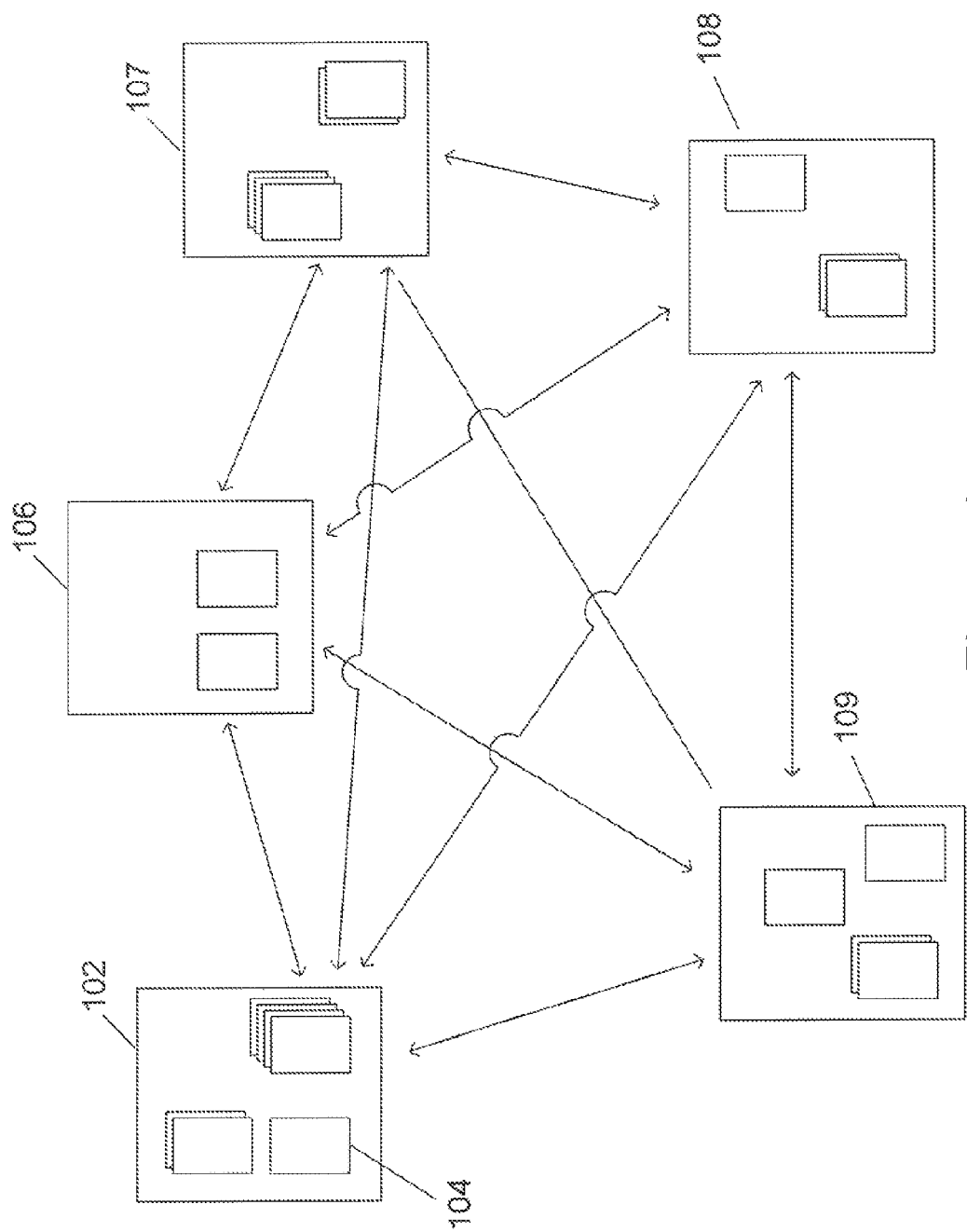
FIG. 1 illustrates a general computing environment in which a tag-associated data-object storage system can be employed.

FIG. 1 illustrates a general computing environment in which a tag-associated data-object storage system can be employed. In FIG. 1, a number of user computer systems are represented as rectangles, including user computer system 102. In FIG. 1, five different users access data objects, represented in FIG. 1 by small rectangles, including rectangle 104, stored on the five user computer systems used by the five different users 102 and 106-109. The five users may, for example, be five software developers within a software-development project, each generating program-code files, executables, design documents, and other files that are shared among the five software developers. The software developers may generate the files, or data objects, on their own personal computers and store the data objects within their local file systems. The developers can also exchange data objects with one another through a distributed file system or by transferring data objects to one another as email attachments or through various file-transfer protocols. This functionality is generally supported by common personal-computer operating systems and personal-computer networking systems.

Unfortunately, the simple data-object sharing system shown in FIG. 1, implemented using standard personal computer ("PC") operating-system and networking functionality, can quickly lead to serious problems. One problem is that multiple copies of any particular data object may end up distributed across multiple computer systems, and may be modified by multiple users or used as a parent data object in a chain of derived data objects in different systems, with the result that, following modification or derivation, there remains no single, authoritative copy or source of the data object. Ultimately, a particular user may need to find, collect, and merge all of the different copies and derivations in order to generate an authoritative or source data object. Another problem is that, with no single, well-known starting point for searching, it may become difficult or impossible to find all of the data objects related to the software project, or a particular aspect of the software project. Yet another problem is that two different users may delete a particular data object, two copies of which are stored on their respective PCs, each user assuming that the other user intends to maintain a copy of the data object on his or her PC. As a result, the data object may become irretrievably lost. Many other similar and related problems can quickly arise in such ad hoc data-object storage systems.

As a result of these types of problems, a variety of different types of data management systems have been developed, including database management systems, distributed file systems, version-control systems, and other such data-management systems. These various types of data-management systems may be implemented as centralized data-object storage systems or as distributed data-object storage systems that are accessible by multiple local and remote users through a common interface and that provide robust data storage, allowing the users to create, store, and share data objects among themselves without encountering the types of problems discussed above with reference to FIG. 1.

Figure 2:
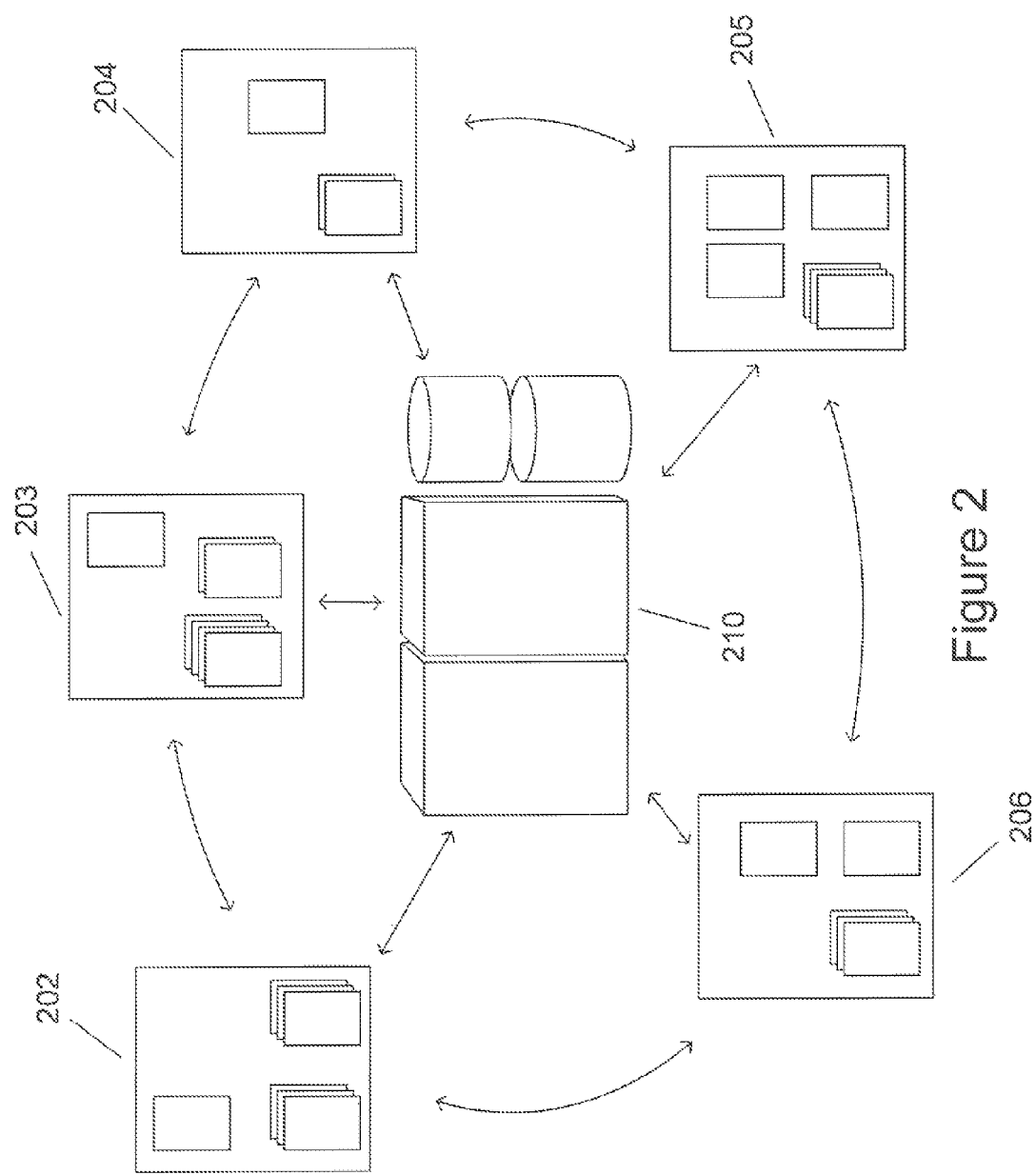
FIG. 2 illustrates an exemplary centralized data-management system in the context of the five-software-developer computational environment discussed with reference to FIG. 1.

FIG. 2 illustrates an exemplary centralized data-management system in the context of the five-software-developer computational environment discussed with reference to FIG. 1. In FIG. 2, the five developer PCs 202-206 are fully linked together by one or more networking systems so that each developer can exchange electronic data with each of the other developers, just as in the computational environment shown in FIG. 1. As in the computational environment shown in FIG. 1, each user may generate multiple data objects, including program-code files, executables, and other such project-related data objects. However, unlike the ad hoc system discussed with reference to FIG. 1, data-object storage is managed by a centralized data-object storage system 210. Although this system is shown as a single, centralized system in FIG. 2, the system may be one or a number of the developers' PCs running a distributed data-object-storage and data-object-management system or another type of multi-computer system. In the computational environment shown in FIG. 2, users store data objects in the centralized data-object storage system 210 and retrieve data objects from the centralized data-storage system 210, rather than simply sharing data objects among themselves in an ad hoc fashion. The centralized or distributed data-object storage system may include a variety of features and technologies to ensure that an authoritative copy of any particular data object always resides in, or can be assembled from, information reliably stored within the centralized data-object storage system. The centralized or distributed data-object storage system may provide a user interface and data-object-storage protocols for version control, locking of data objects, reservation of data objects for future locking, redundant backup, and other such features to assist the developers in efficiently and cooperatively storing and retrieving data objects from the distributed or centralized data-object storage system.

Figure 3:
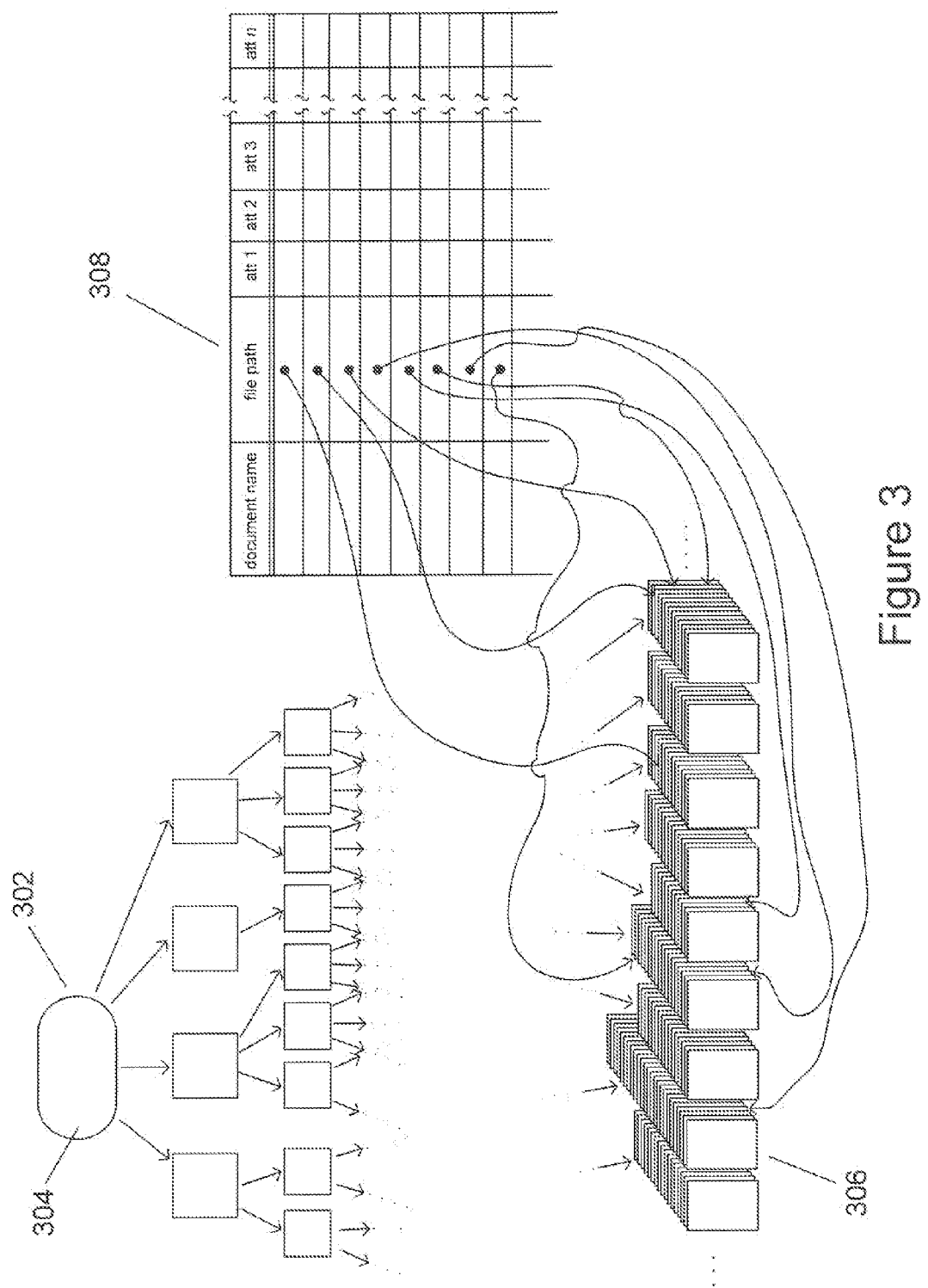
FIG. 3 illustrates certain of the logical structures that may be employed by a centralized data-object storage system, such as that discussed with reference to FIG. 2.

FIG. 3 illustrates certain of the logical structures that may be employed by a centralized data-object storage system, such as that discussed with reference to FIG. 2. The data objects may be logically organized into one or more hierarchical trees 302 of data objects, each tree including a root node 304 and tiers of branching intermediate nodes, with lowest-level leaf nodes including pointers to individual data objects 306. This hierarchical arrangement of data objects may be implemented by one or more relational database management tables 308, as well as a traditional hierarchical file system, so that a relational query-language interface, such as an SQL-based interface, can be used to implement useful and powerful data-object searching and retrieval facilities, version control, different types of data-object locking, and many of the other features provided by such data-object storage systems.

While the distributed or centralized data-object storage systems discussed with reference to FIGS. 2 and 3 provide mature, powerful, and highly reliable data-object storage, these systems often involve time-consuming design, configuration, and management. For example, the hierarchical organization of data objects often needs to be at least partially designed and created in advance of data-object storage and retrieval. Furthermore, these systems may provide relatively complex user interfaces in order to offer, to users of the systems, the many different features and facilities designed into these systems. In many cases, these systems are considered to be too expensive and complex for many types of unstructured or lightly structured, spontaneous data-object sharing and storage within user communities, including project-oriented software-developer communities and loosely structured communities arising from social networks, interest groups, and other such associations that arise among networked computer users.

Figure 4:
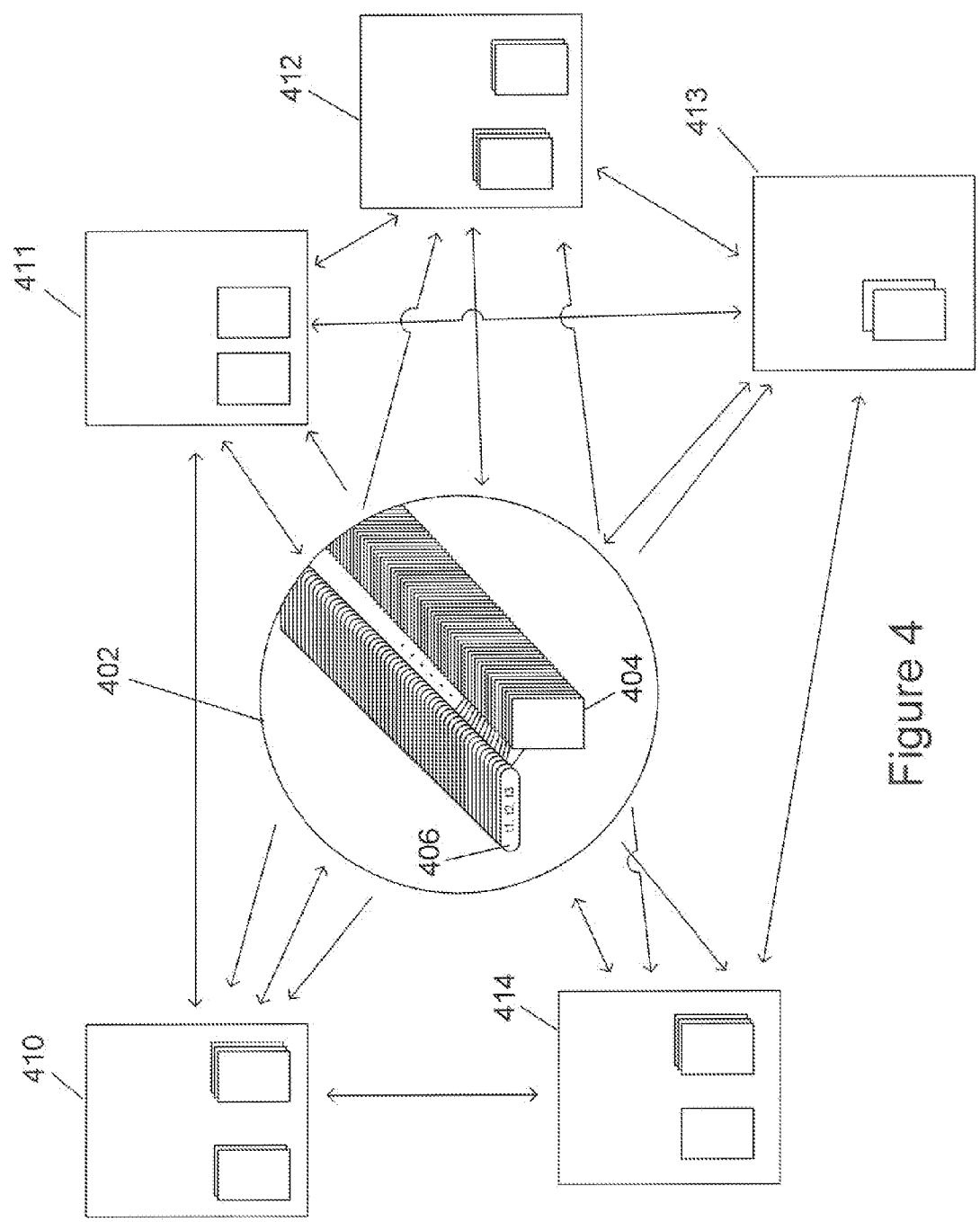
FIG. 4 illustrates use of a tag-associated data-object storage system.

In order to provide a simpler interface and to provide the ability to spontaneously create and store data objects by multiple users for subsequent retrieval and access, tag-associated data-object storage systems have been developed. FIG. 4 illustrates use of a tag-associated data-object storage system. The tag-associated data-object storage system can be viewed, as shown in FIG. 4, as a collection of tag-associated data objects 402. Each data object in a stored collection of data objects, such as data object 404, is associated with one or more tags 406. The tags are generally alphanumeric character strings, and are generally relatively short. For example, tags may be limited to a maximum of ten characters and symbols, 20 characters and symbols, 128 characters and symbols, or some other reasonable maximum character-and-symbol length. Tags are often meant to be descriptive attributes, such as natural-language adjectives that characterize a data object to the user who initially stores the data object in the data-object storage system. However, there is no requirement that tags be semantically related to the objects with which they are associated. That user, or other users, can subsequently employ one or more of the tags to describe a desired data object for retrieval from the data-object storage system. As in the centralized or distributed data-object storage system discussed with reference to FIG. 2, each user 410-414 of the tag-associated data-object storage system may store tag-associated data objects into the tag-associated data-object storage system and retrieve tag-associated data objects from the data-object storage system. The tag-associated data-object storage system may be implemented as a centralized data-object storage system or as a distributed data-object storage system, either by undertaking new design and implementation or by using relational database management system technology, distributed file systems with additional scripts for programs, or any of various currently available electronic data storage systems and methods.

Tag-associated data-object storage systems have advantages for data-object management among a group of cooperating users. As one example, rather than undertaking a tedious, expensive, and time-consuming data-object-storage-system configuration and carrying out ongoing monitoring and maintenance of the system, users can immediately begin to store and retrieve tag-associated data objects to and from a simple tag-associated data-object storage system provided as an easily accessible tool to the users. In general, the tag-associated data-object storage systems provide a simple user interface, an example of which is discussed further below, to allow a user to associate one or more tags with a data object and to then store the tag-associated data object into the data-object storage system. Similarly, a simple user interface allows users to select one or more tags, and to then retrieve data objects from the tag-associated data-object storage system associated with the selected tags. From the user's standpoint, the tag-associated data-object storage system is essentially structureless, apart from user-defined tags that users themselves associate with data objects that they store into the tag-associated data-object storage system. The tag-associated data-object storage system may provide additional management tools, redundant storage of data objects, data-object recovery in the case of disk failures or other component failures, and other features normally associated with complex, centralized data-object storage systems. From a user's standpoint, however, the data-object storage and data-object retrieval interfaces are simple and intuitive.

Figure 5:
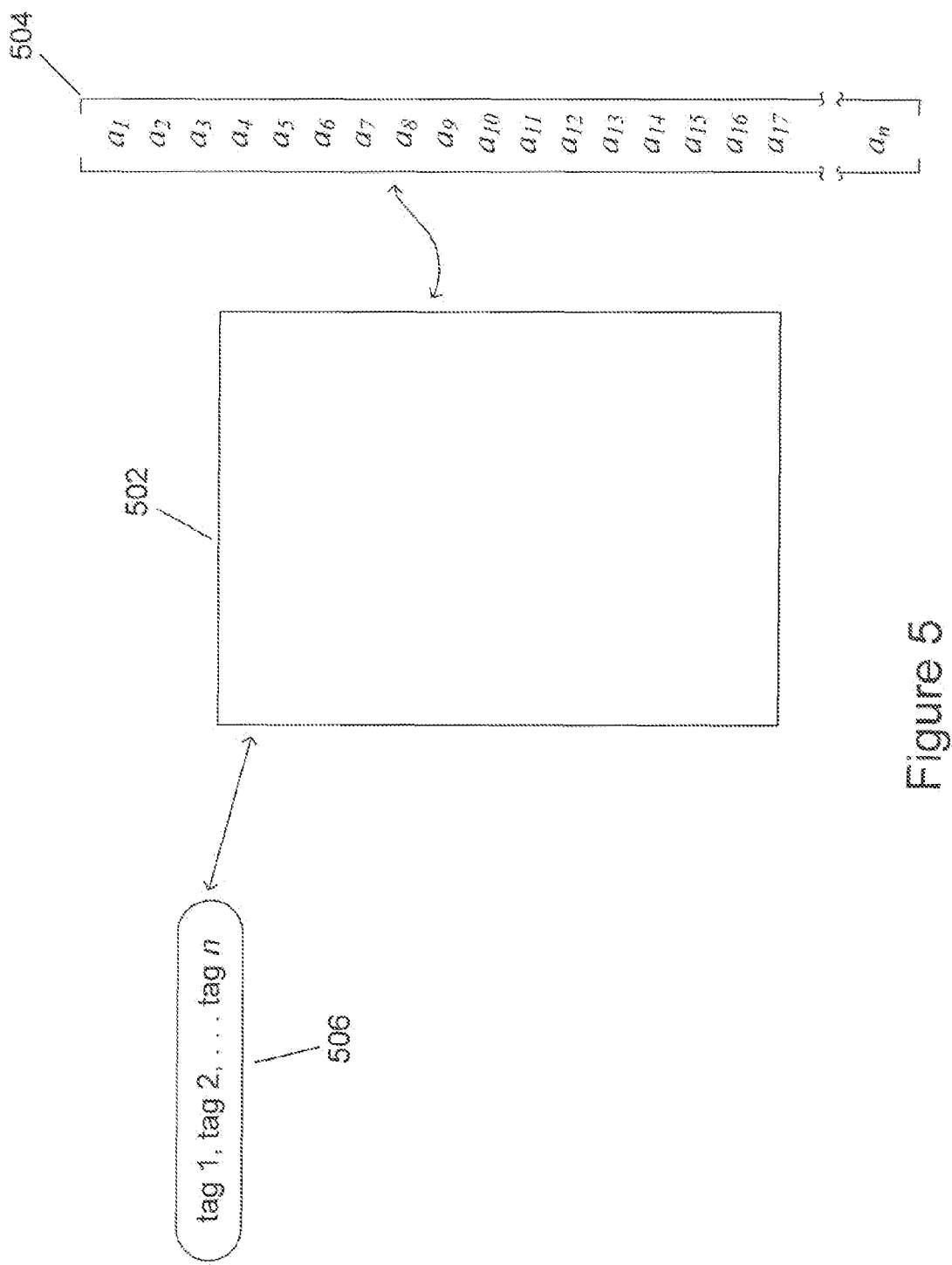
FIG. 5 provides a logical or conceptual view of a tag-associated data object stored in a tag-associated data-object storage system.

FIG. 5 provides a logical or conceptual view of a tag-associated data object stored in a tag-associated data-object storage system. A data object 502, in the most general case, may be one or more bytes of digitally encoded information. In many cases, data objects are application-generated files, such as documents produced by word-processing applications, application data files, images, and other files. In many tag-associated data-object storage systems, the data objects are assumed to be files that are managed by operating systems or stand-alone file systems.

For purposes of describing the present invention, the structure and content of data objects are not relevant, except for the fact that the data content of data objects is assumed to be characterizable by one or more metrics, parameters, or other numeric values. As one example, a data object may be a text file, in which case the data object can be characterized by the frequencies of word occurrences within the document, a length, in characters, frequency of occurrence of various phrases and other word combinations, the presence of certain word or phrase patterns, and other such metrics and characteristics. In embodiments of the present invention, various numerically valued characteristics and parameters by which a data object is described can be considered to be the components of a vector 504 that characterizes the contents of the data object, and that is therefore referred to, below, as a "characteristic vector." In certain embodiments of the present system, different characteristic vectors may be associated with a particular data object at different points in time, with respect to different operations or tasks that are being undertaken on behalf of a user, and with respect to the types of data objects that are stored in, or being retrieved from, a tag-associated data-object storage system. For example, a characteristic vector computed for an email data object during retrieval of emails from a tag-associated data-object storage system may have a different number and types of elements than a characteristic vector computed for a news-article data object during retrieval of news articles from a tag-associated data-object storage system. The characteristic vectors for data objects may be of extremely high dimensionality. For purposes of describing the present invention, the vectors are assumed to be normalized, meaning that the dot product of any data-object characteristic vector with itself produces the value "1." A non-normalized vector can easily be normalized by dividing the vector components by the vector's length, or magnitude:

$$A_{normalized} = \frac{A}{|(A \cdot A)^{1/2}|}$$

In many cases, characteristic vectors are not linear combinations of orthonormal basis vectors, and therefore the dot product may include many additional product terms in addition to the squares of the components.

Returning to generalized, currently existing tag-associated data-object storage systems, each data object stored in a tag-associated data-object storage system is also generally associated with user-defined tags 506, as discussed above. As also discussed above, the tags are generally alphanumeric character strings, often with natural-language meanings.

Figure 6:
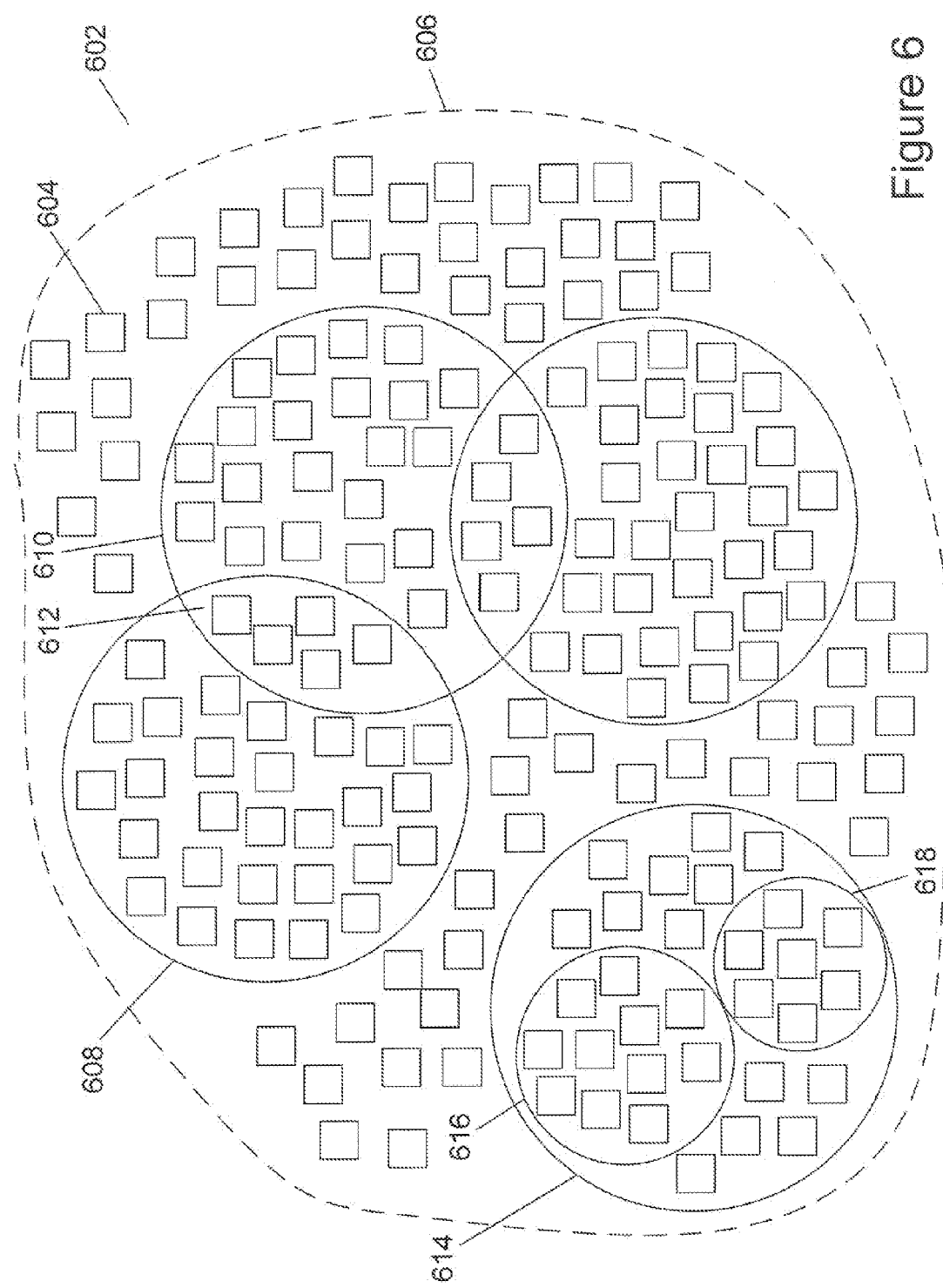
FIG. 6 illustrates groups and subgroups of data objects within a domain of data objects stored in a tag-associated data-storage system.

In a generalized tag-associated data-object storage system, data objects may belong to groups of data objects and/or to subgroups of groups or other subgroups, each group or subgroup defined by the tags associated with the data objects that the group or subgroup contains. FIG. 6 illustrates groups and subgroups of data objects within a domain of data objects stored in a tag-associated data-storage system. All of the data objects may be considered to be members of a highest-level domain 602, shown in FIG. 6 as the collection of data objects, such as data object 604, within a dashed circle 606. A tag-associated data-object storage system may support multiple storage domains, or, alternatively, a tag-associated data-object storage system may support only a single domain. In addition, various different groupings of data objects within a domain may be defined by sets of one or more tags. In FIG. 6, groups of tags are shown as a collection of tags within circles, such as the tags within circle 608. In the most general case, the different groupings of data objects may not be mutually exclusive, so that groups may overlap one another as shown in FIG. 6. As one example, the data objects within circle 608 may all be associated with the tag "blue," while the data objects within circle 610 are associated with the tag "red." The data objects within the intersection of groups 608 and 610, in the region 612 of overlap between groups 608 and 610, are those data objects associated with both the tag "blue" and the tag "red." In FIG. 6, the group of data objects defined by circle 614 is shown to include two subgroups defined by circles 616 and 618. Various different tag-associated data-storage systems may constrain association of tags with data objects, and may not formally recognize groups, subgroups, and other such groupings of data objects stored in the tag-associated data-object storage system.

It is important to note that, in many embodiments of the present invention, groups and other hierarchical data-object organizational concepts may be deliberately not supported. In many case, groups and other hierarchical organizational concepts fail to provide significant benefit to users, and may have various deleterious affects on the usability of a tag-associated data-object storage system, including contributing to tag explosion, as discussed below.

Figure 7:
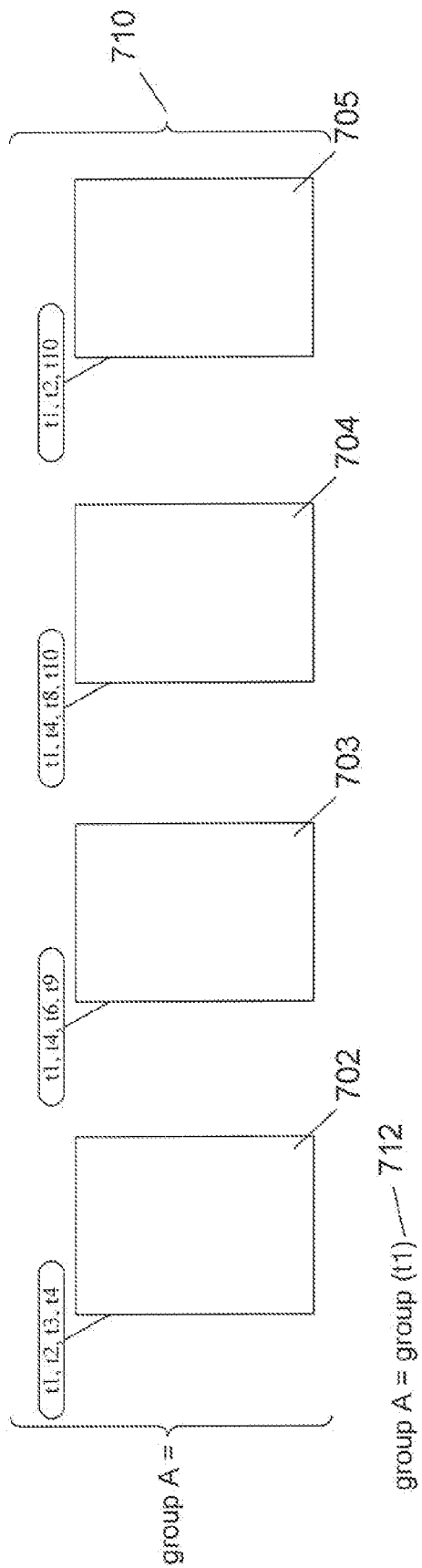
FIG. 7 illustrates certain generalized operations that may be provided by a tag-associated data-object storage system.

FIG. 7 illustrates certain generalized operations that may be provided by a tag-associated data-object storage system. In FIG. 7, four data objects 702-705 are shown to be members of a group of data objects referred to as "group A" 710. Note that a group may be an entire domain, such as domain 602 shown in FIG. 6, or may be a subset of a domain, such as groups 608, 610, 614, 616, and 618 in FIG. 6. Exemplary operations include: (1) defining a group 712; (2) retrieving a list of all of the tags associated with members of a group 714; (3) retrieving the common tags of all members of a group 716; (4) retrieving all of the tags associated with members of a group in frequency-of-association order 718; (5) retrieving a list of data objects that are each associated with the tags in a list of tags supplied as arguments 720; and (6) adding a data object, or entity, to the tag-associated data-Object storage system 722. Many additional operations may be provided by a particular tag-associated data-object storage system.

Figure 8A:
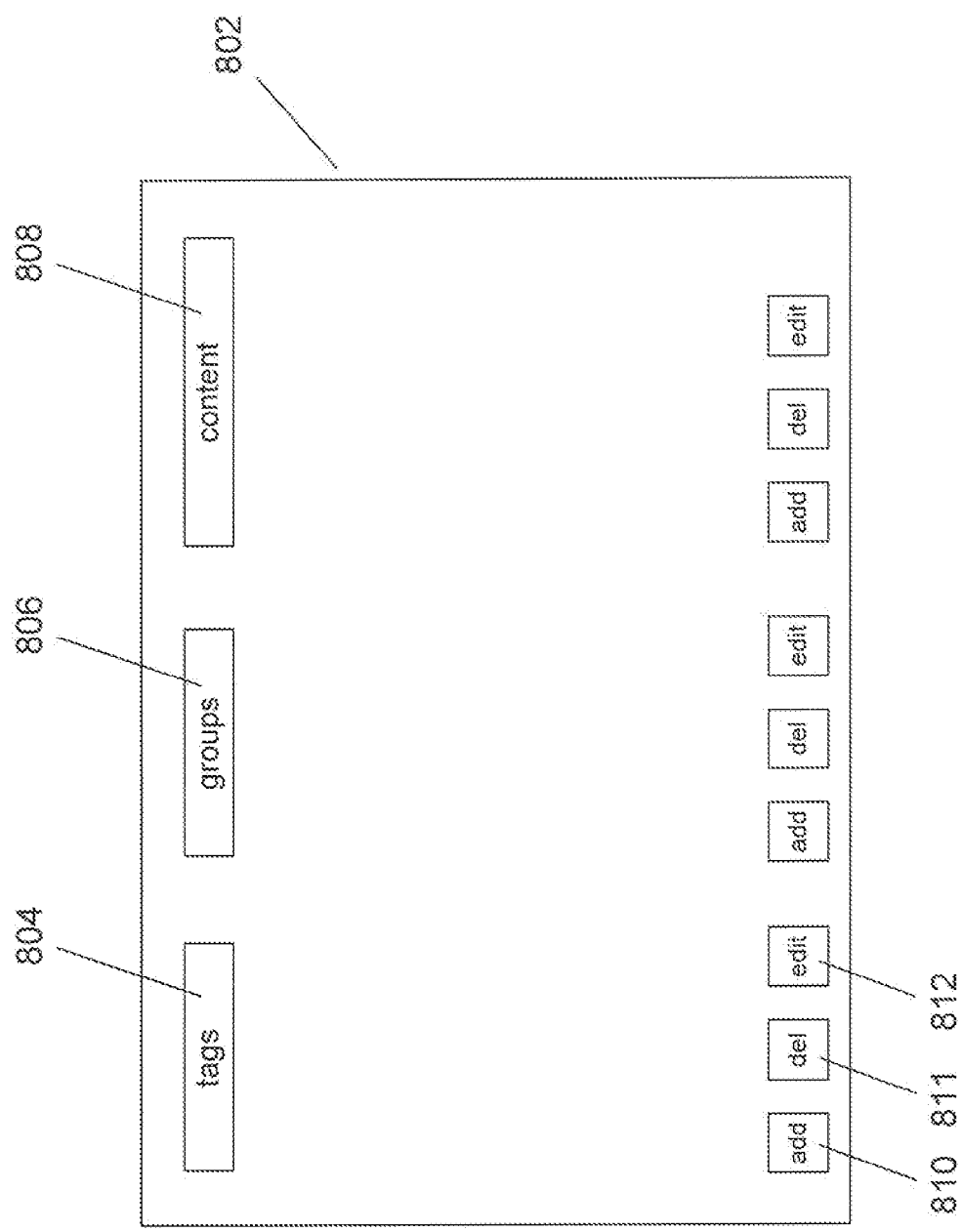
FIGS. 8A-I illustrate a simple user interface provided by a hypothetical, currently-available tag-associated data-object storage system.
Figure 8B:
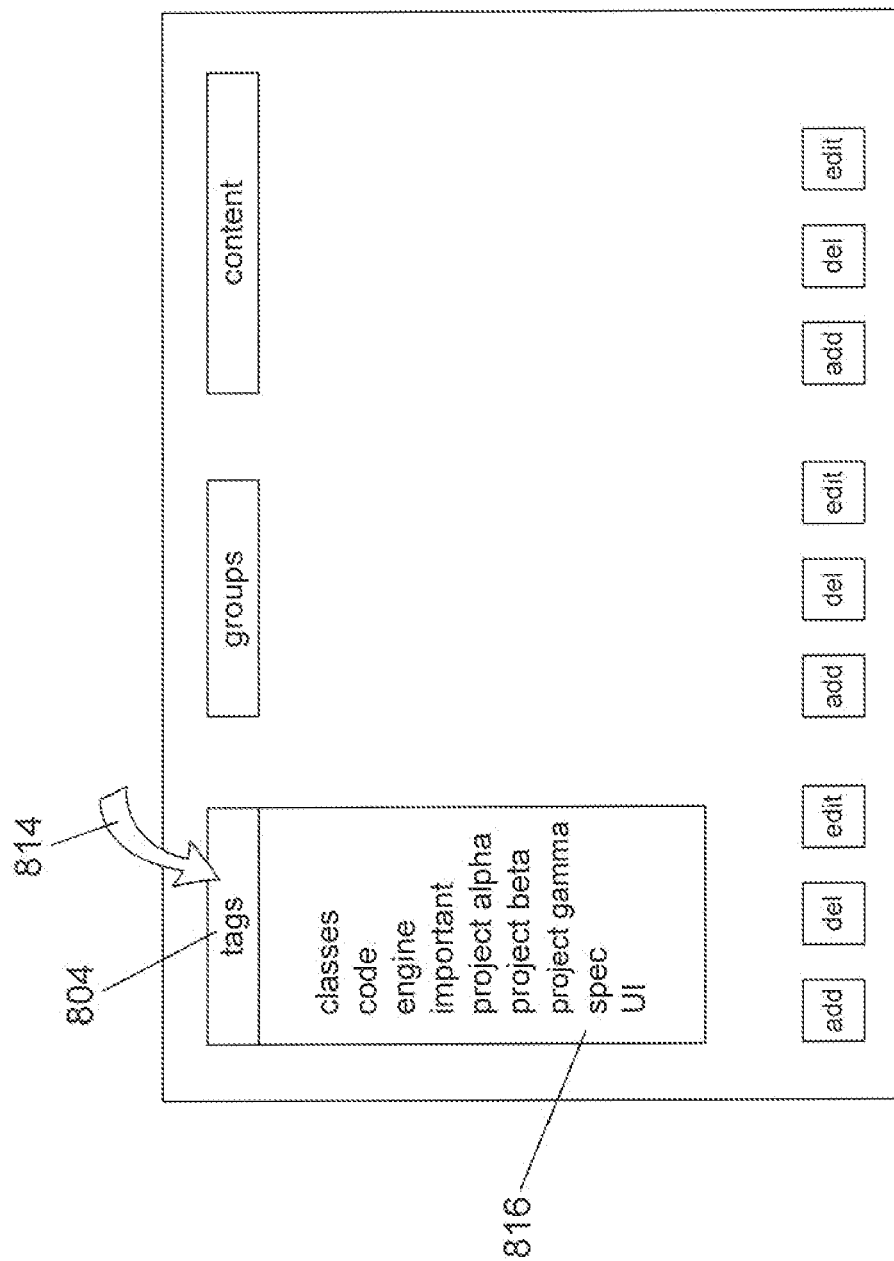
Figure 8C:
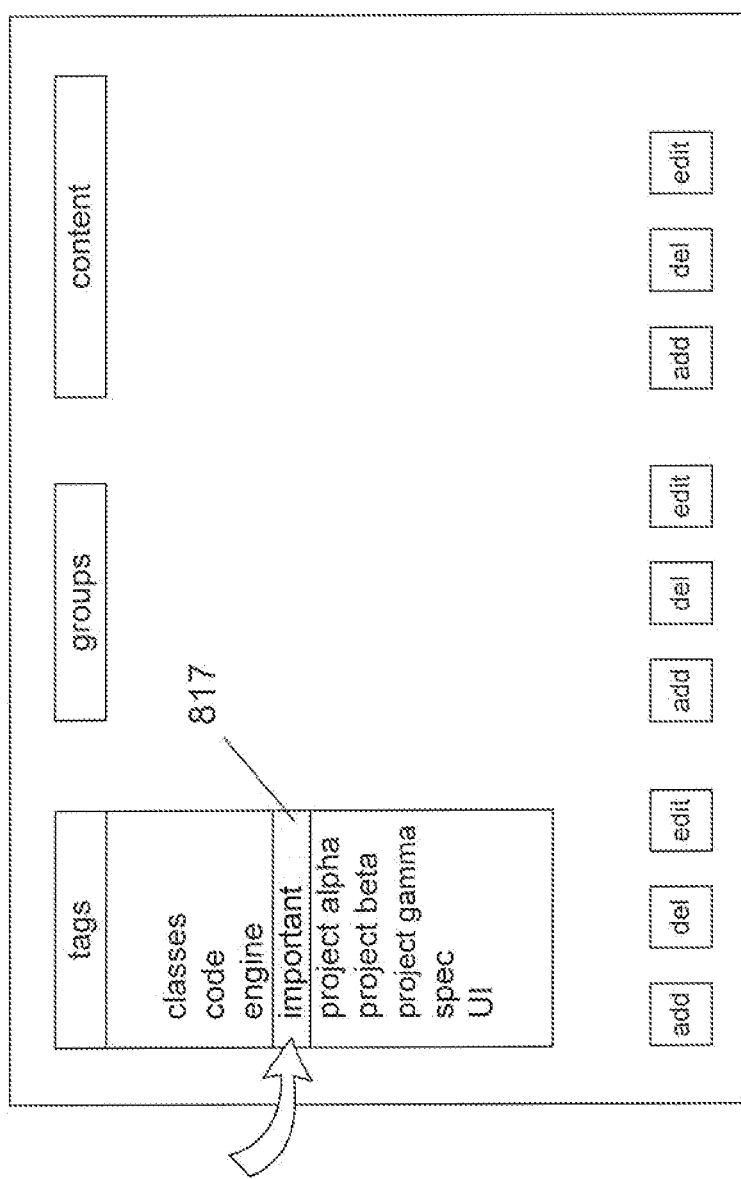
Figure 8D:
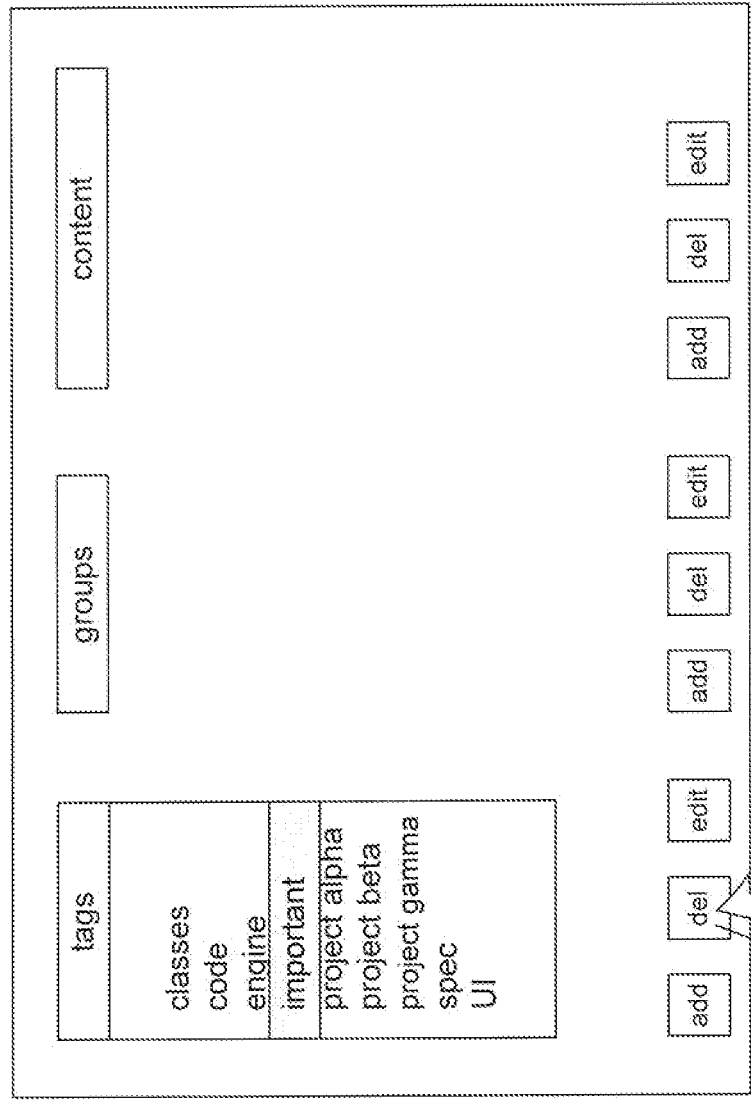
Figure 8E:
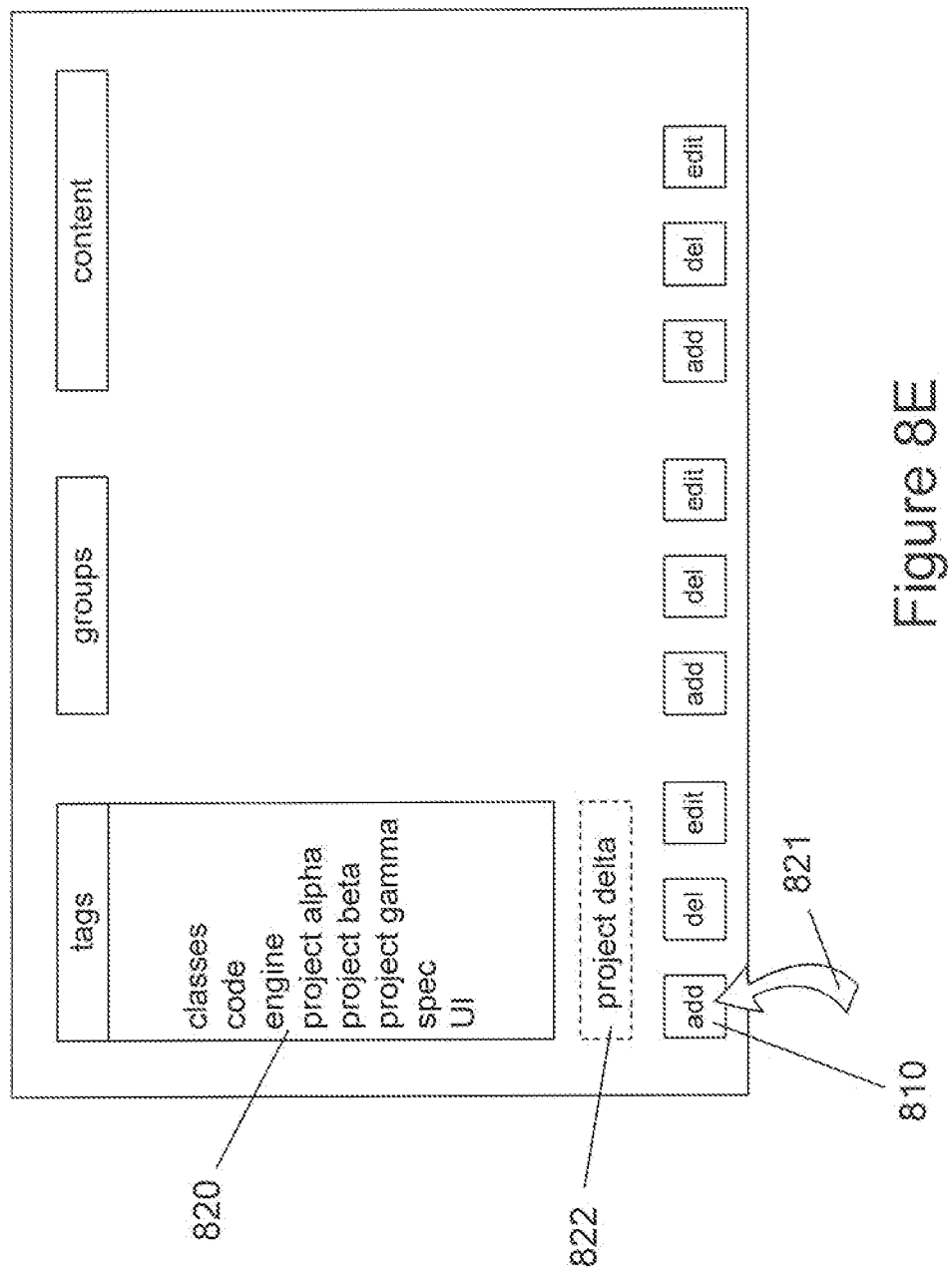
Figure 8F:
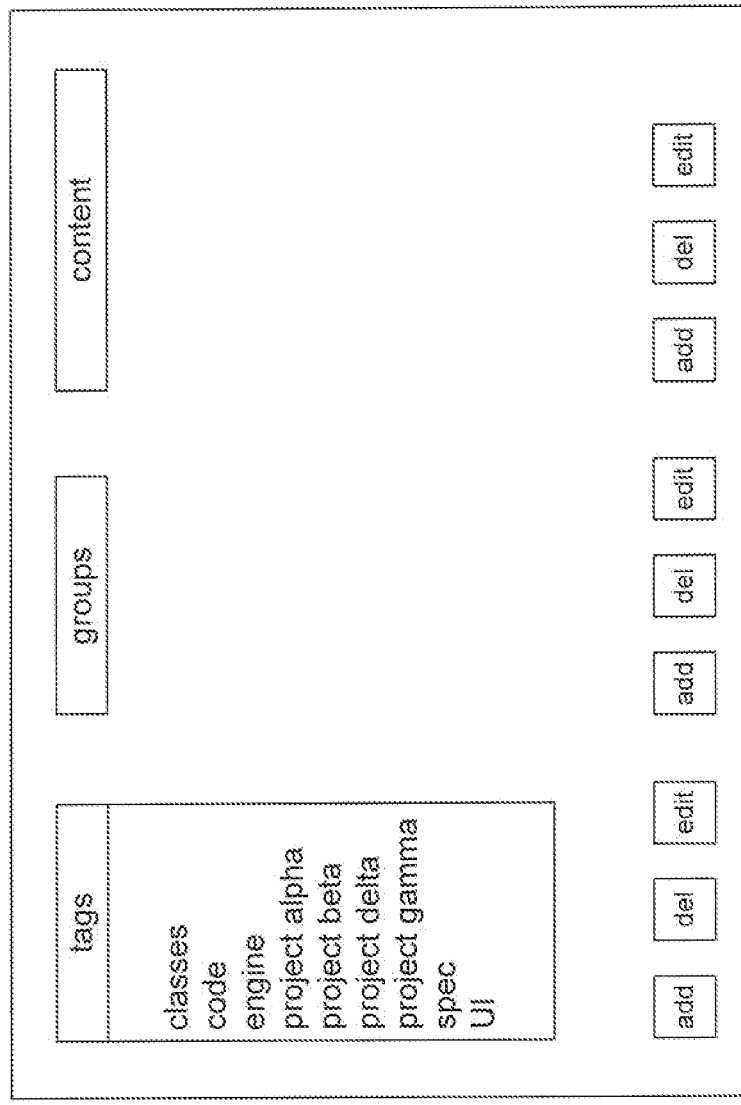

FIGS. 8A-I illustrate a simple user interface provided by a hypothetical, currently-available tag-associated data-object storage system. As shown in FIG. 8A, the simple user interface 802 includes a "tags" button 804, a "groups" button 806, and a "content" button 808. For each of the above-mentioned buttons, there are "add" 810. "delete" 811, and "edit" 812 buttons to provide for adding and deleting tags, groups, and data objects to and from the tag-associated data-object storage system as well as editing representations of tags, groups, and data objects. In FIG. 8B, a user has placed a cursor 814 on the "tags" button 804 and input a mouse click resulting in display of a list of tags 816 associated with data objects stored in the tag-associated data-object storage system. As with many user interfaces, were the list of tags too long for display in the user interface, the list window may display a scroll bar or paging button in order to allow a user to scroll or step through a longer list of tags than can be displayed at one time. In FIG. 8C, the user has placed a cursor over a particular tag, the tag "important" 817, and input a mouse click in order to select, or highlight, the tag "important." Once the tag is selected, the user can place a cursor over the "delete" button 811, as shown in FIG. 8D, in order to delete the tag. In FIG. 8E, the displayed list of tags 820 no longer includes the tag "important." In FIG. 8E, the user has subsequently placed the cursor 821 over the "add" button 810 to add a tag to the list of tags. A tag-entry window 822 is displayed, into which the user can type the alphanumeric-character-string representation of the new tag. Inputting another mouse click, or depressing the "enter" key, results in addition or the new tag to the list of tags, as shown in FIG. 8F. More than one tag can be selected at a given time. When tags are deleted, the definitions of groups that include the deleted tag are also modified and, in the case of a group defined only by the deleted tag, the group itself may be deleted.

Figure 8G:
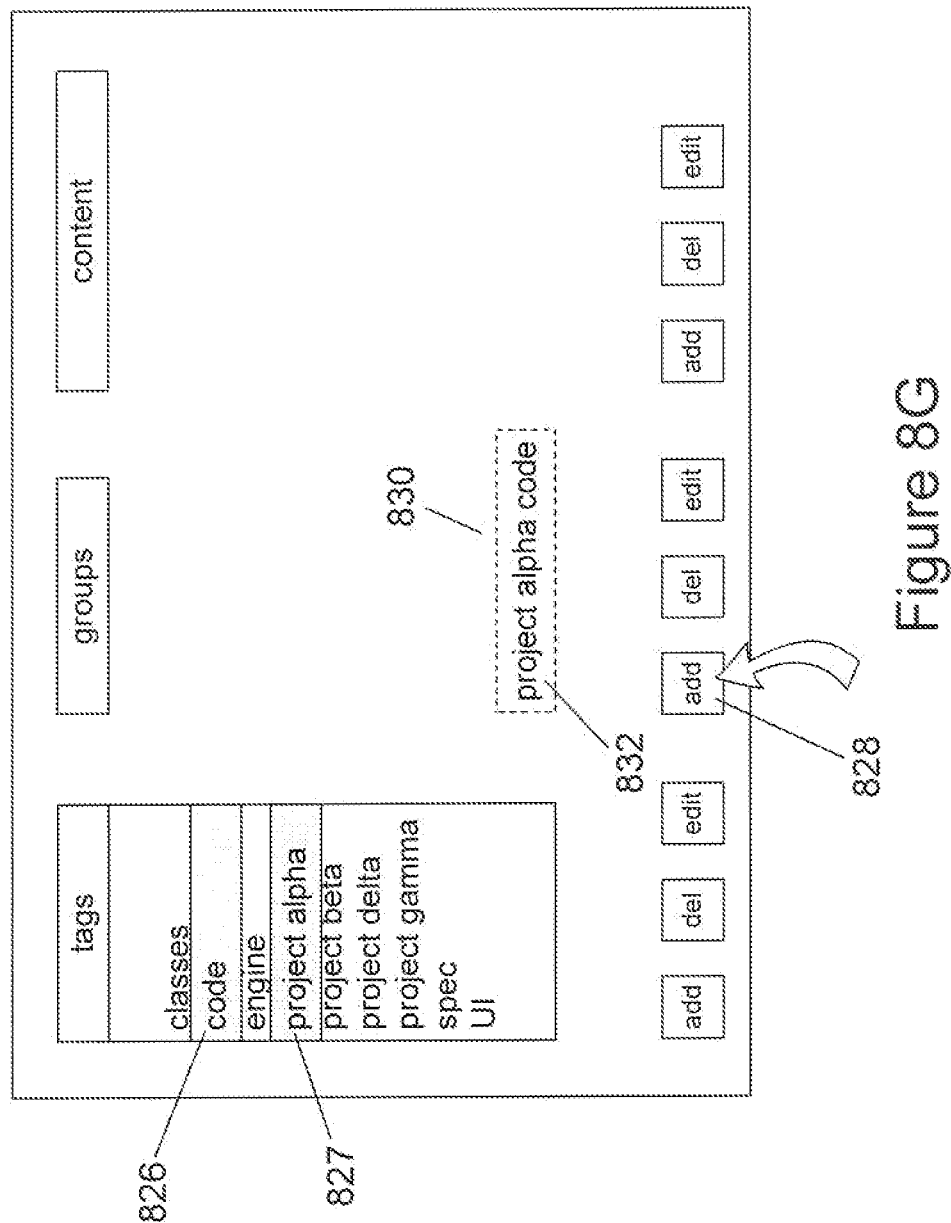
Figure 8H:
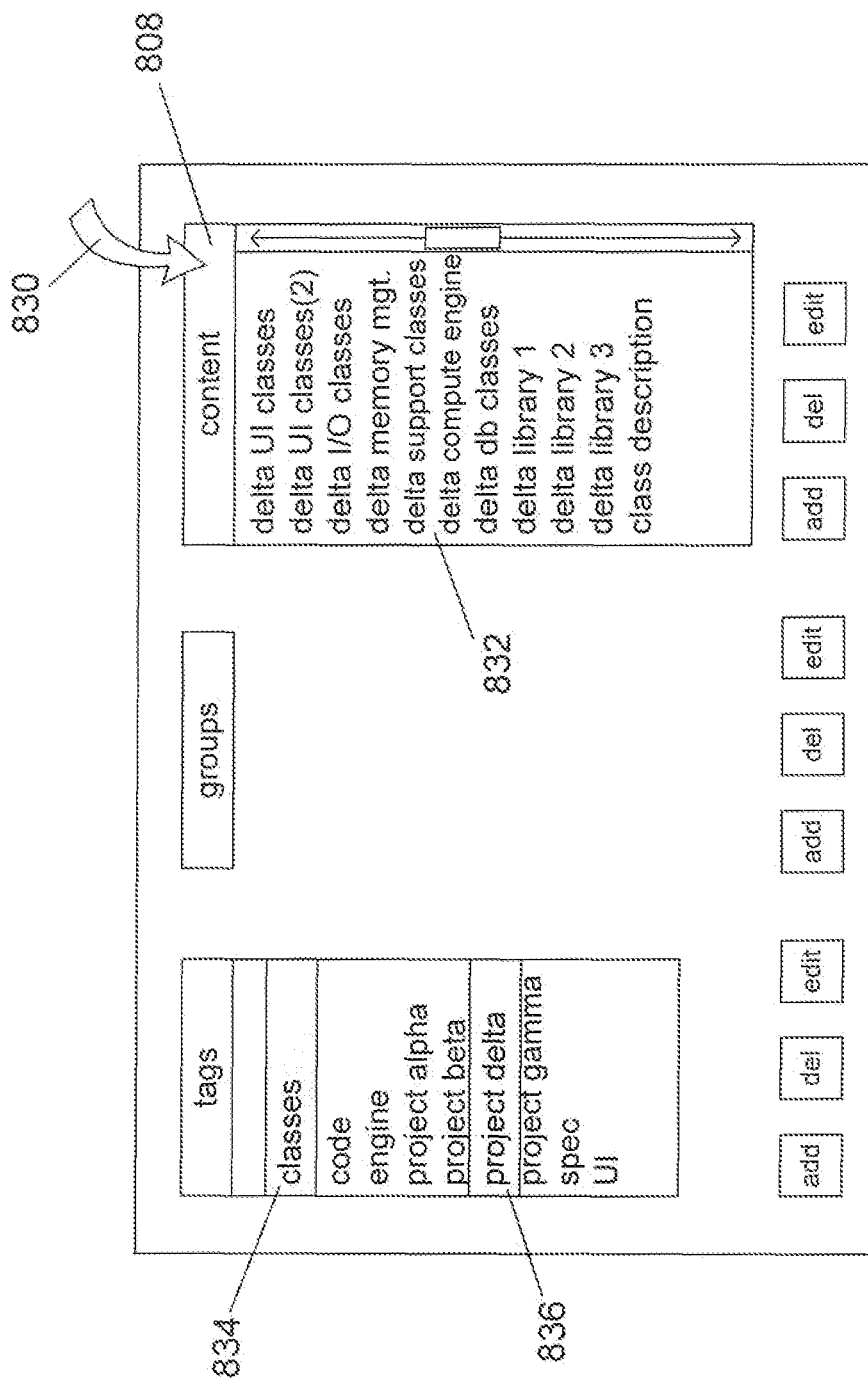
Figure 8I:
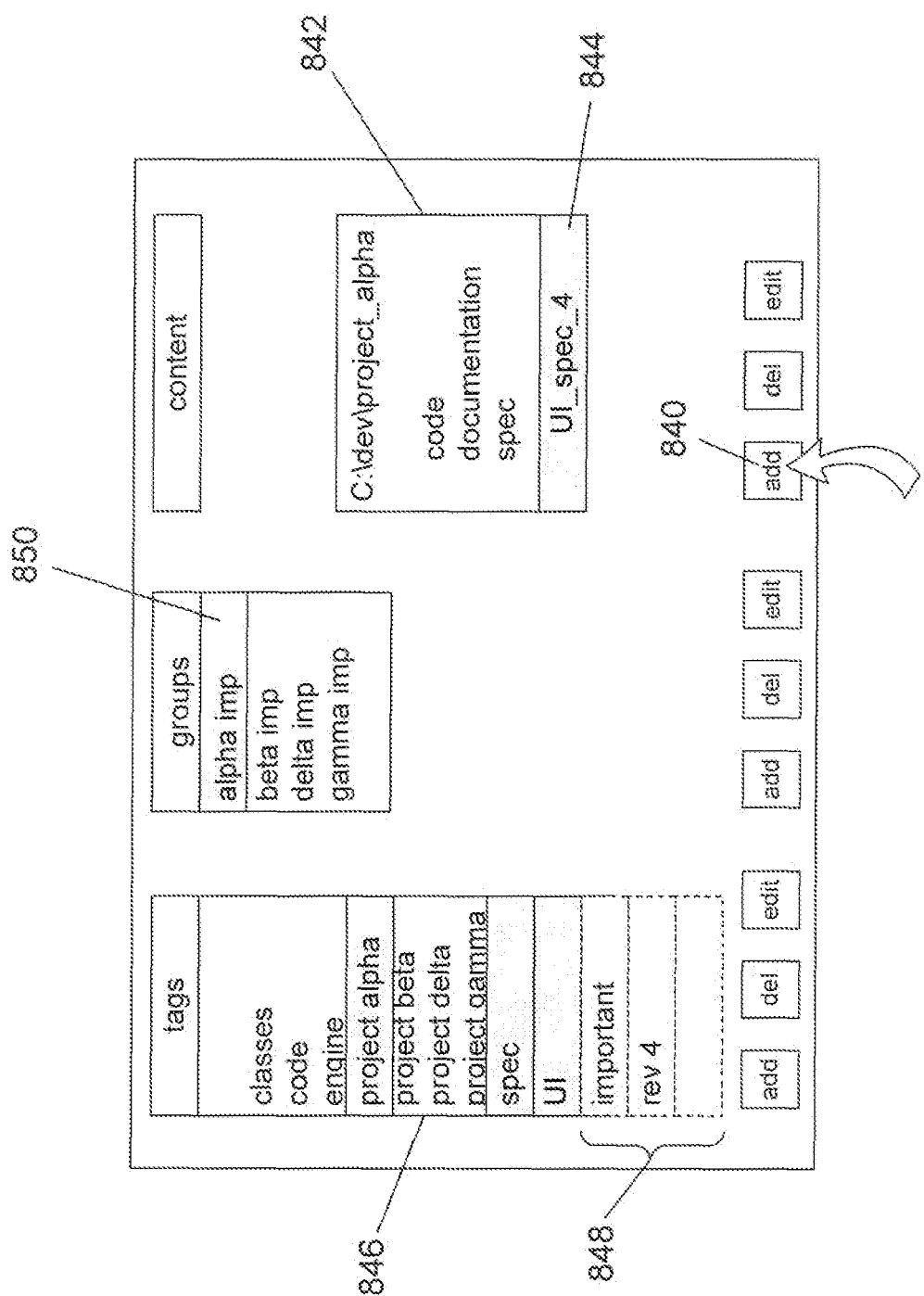

In FIG. 8G, the user has selected two tags 826 and 827 and has input a mouse click to the "add" button 828 in order to invoke a new-group-entry window 830 into which the user has typed the name of a new group 832 defined as a list of the two selected tags 806 and 807. The new group "project alpha code" can then be added to the tag-associated data-object storage system by depressing the "enter" key or through an additional click to the add button 828. In FIG. 8H, a user has replaced the cursor 830 over the content button 808 and input a mouse click in order to display a list of data objects 832 associated with the tags "classes" 834 and "project delta" 836. The data objects may have names assigned by users and input to the tag-associated data-object storage system, in certain tag-associated data-object storage systems, or may have file-system file names, in alternative tag-associated data-object storage systems. In FIG. 8I, a user has input a mouse click to the add button 840 in order to display a browser window 842 that allows a user to browse through a local file system in order to identify a particular file 844 that the user wishes to add, as a new data object, to the tag-associated data-object storage system. The user input displays a list of all of the tags 846 currently defined for objects in the tag-associated data-object storage system as well as displaying additional tag-entry windows 848 to allow a user to define new tags to associate with the data object corresponding to the file 844 that the user intends to add as a new object into the tag-associated data-object storage system. The user may have also selected a group 850 to which the data object is to be assigned, resulting in automatic selection of the tags included in the list of tags that define the group. By depressing the "enter" key or inputting an additional mouse click to the "add" button 840, the file 844 is added, as a new data object, to the tag-associated data-object storage system, with the new data object associated with the group "alpha IMP" 850, and the five tags "project alpha," "spec," UI," "important," and "rev 4."

As those familiar with computer applications and data-management systems certainly appreciate, there are an almost limitless number of different simple user interfaces that can be designed and implemented for any particular tag-associated data-object storage system. The interface described with reference to FIGS. 8A-1 is provided merely as an example of a user interface provided by a tag-associated data-object storage system.

While tag-associated data-object storage is intuitive, simple, and can be undertaken relatively spontaneously by groups of users without incurring large expenses and without spending large amounts of time in configuring and maintaining the tag-associated data-object storage system, a tag-associated data-object storage system providing the user interface discussed with reference to FIGS. 8A-1 may, over time, become increasingly less useful to users as a result of tag explosion. When the list of tags displayed to a user during the data-object-entry process, as discussed above with reference to FIG. 8I, is relatively short, a user may quickly decide which tags to associate with the new data object and, more importantly, the user or another users can subsequently easily retrieve data objects by selecting appropriate tags from a relatively short list of possible candidate tags associated with the desired data object or data objects for retrieval. However, because each user is free to define new tags and associate new tags with new data objects, it is common for the number of tags to greatly increase, or explode, over time, resulting in a much less functional and useful data-object storage system.

Figure 9:
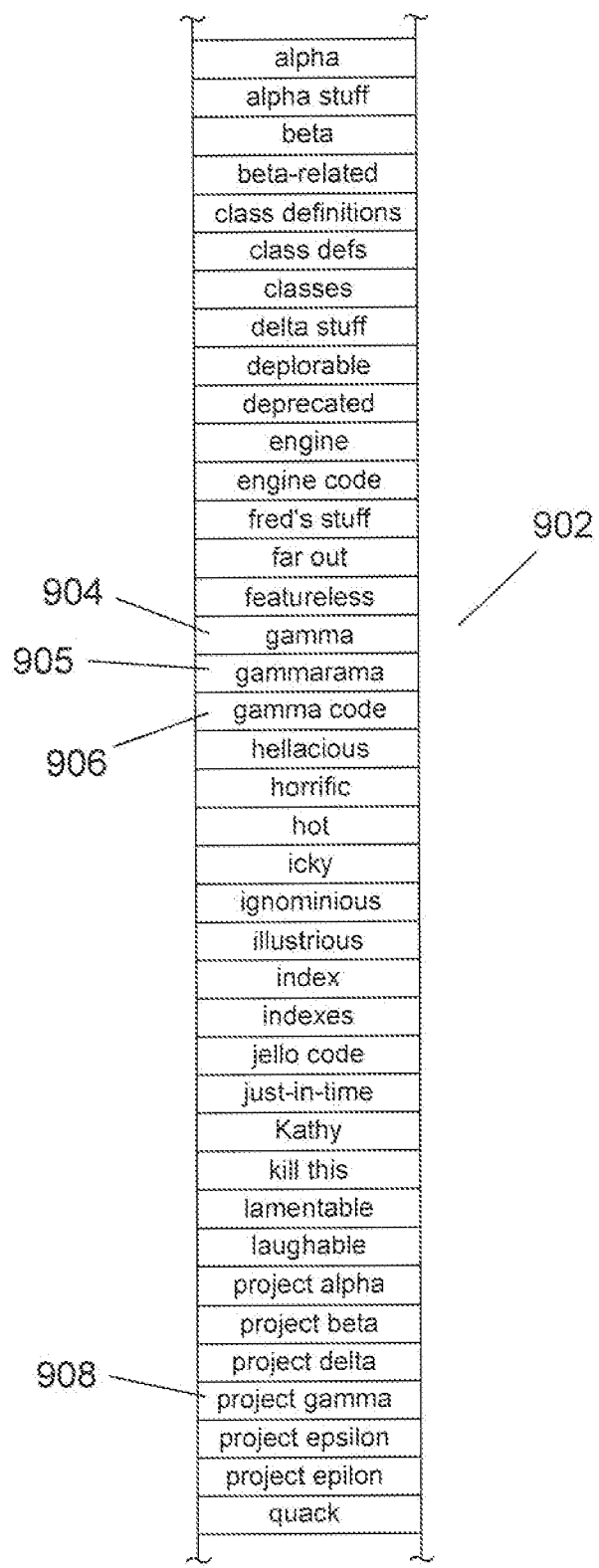
FIG. 9 illustrates a portion of a tag list for a domain of a tag-associated data-object storage system that has experienced tag explosion.

FIG. 9 illustrates a portion of a tag list for a domain of a tag-associated data-object storage system that has experienced tag explosion. A portion of the tag list 902 is not only long and difficult to read through in order to select tags for either storage or retrieval operations, but also includes many similar and synonymous tags, such as the tags "gamma" 904, "gammarama" 905, and "gammacode" 906. Presumably, all of these tags were meant to have the effect of associating a data object with the project "gamma," as was the originally defined tag "project gamma" 908. The presence of groups of related tags, such as tags 904-906 and 908 in FIG. 9, results in a partitioning of conceptually related data objects into subgroups, making searches for data objects associated with project gamma a relatively complex and non-intuitive task. Certain tag-associated data-object-storage-system user interfaces may allow for Boolean-algebra for logic expressions that include tags as terms, so that a user can specify a desire to retrieve all data objects associated with any one of the set of tags 904-906 and 908 in FIG. 9:

gamma OR gammarama OR gammacode OR project gamma

However, even with this functionality, a user is still required to know that there are four different tags used to associated data objects with project gamma. As the list of tags increases in length, the chance that users define new tags when adding new data objects to the tag-associated data-object storage system correspondingly increases, since users may not have the time or patience to read through a long list of tags in order to decide whether or not one or more already-defined tags would be appropriate for the new data object.

Figure 10A:
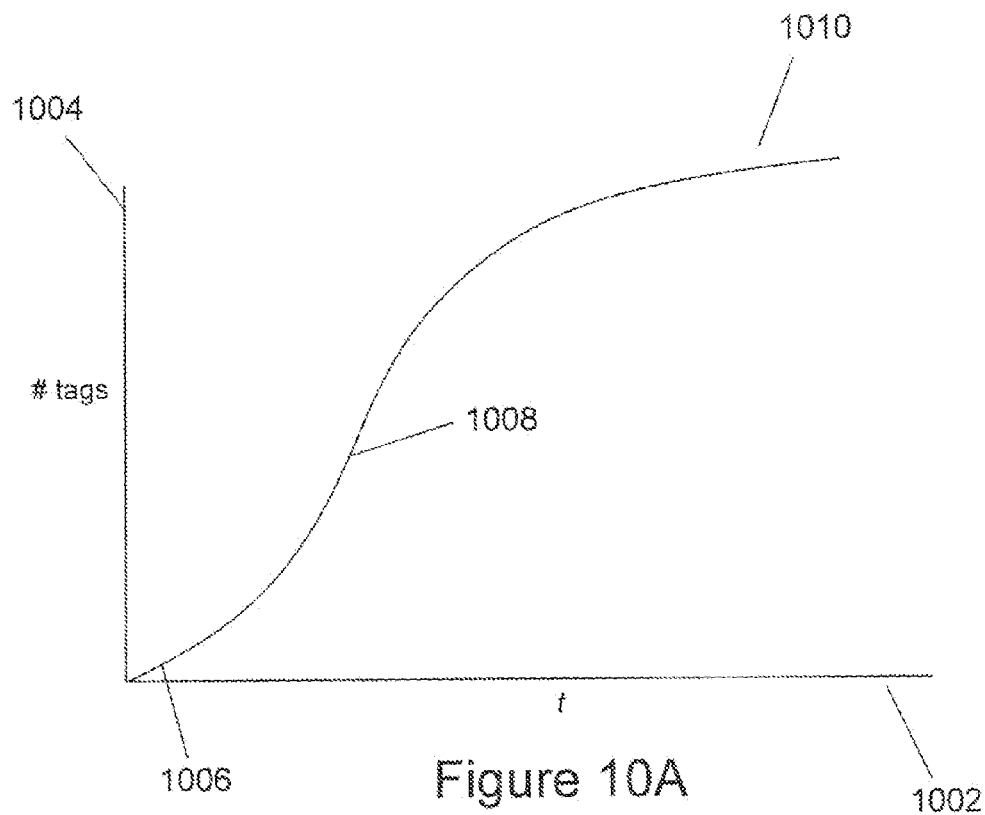
FIGS. 10A-B illustrate two general trends related to tag explosion.
Figure 10B:
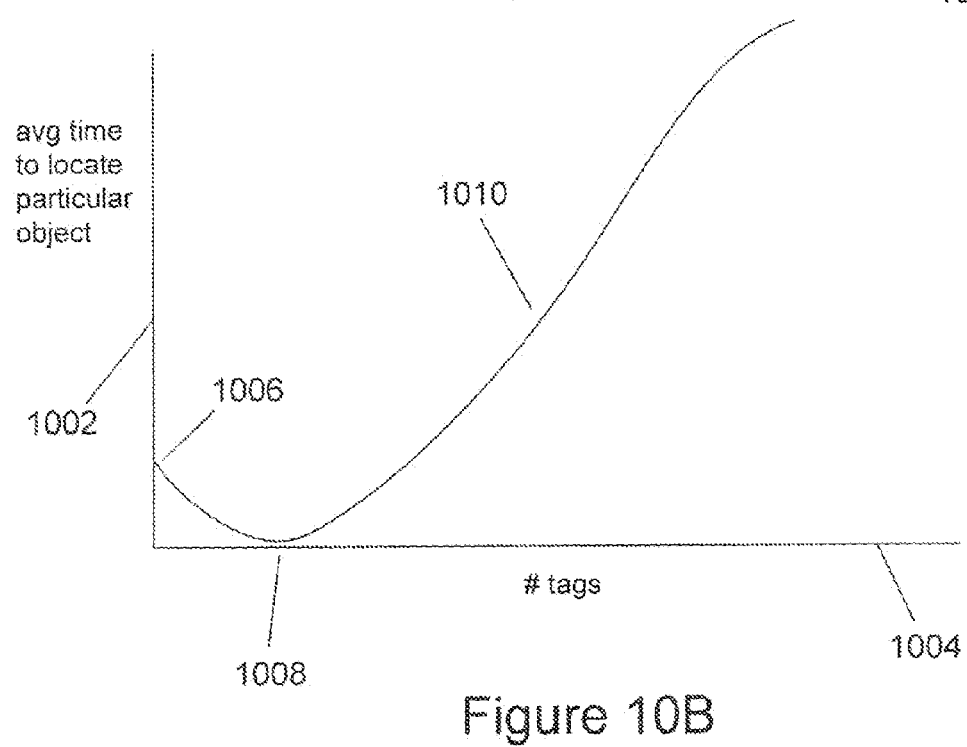

FIGS. 10A-B illustrate two general trends related to tag explosion. In FIG. 10A, time is plotted with respect to the horizontal axis 1002 and the number of user-defined tags is plotted with respect to the vertical axis 1004. Over time, the number of tags initially increases slowly 1006 and then begins to increase very steeply 1008 until so many tags have been defined that the system becomes increasingly less useful to users, who therefore begin to less frequently use the system and therefore less frequently define new tags 1010. Similar plots are obtained by graphing the number of tags defined within a tag-associated data-object storage system with respect to the number of users of the tag-associated data-object storage system. Tag proliferation is, in other words, correlated with time, number of users, and with other parameters, including the user interface of the tag-associated data-object storage system. FIG. 10B illustrates the average amount of time needed to locate a particular data object stored in the tag-associated data-object storage system, plotted with respect to the vertical axis 1002, as a function of the number of tags defined in the tag-associated data-object storage system, plotted with respect to the horizontal axis 1004. Initially, until a minimal set of tags has been defined by users, the time to locate data objects may be significant, but modest 1006. As more tags are defined and associated with data objects, the time to locate a particular data object decreases to a minimal point 1008 and then begin to steeply increase 1010 as the number of user-defined tags increases past the optimal number of tags corresponding to the minimal average data-object-location time.

Embodiments of the present invention were devised in order to constrain tag explosion and encourage users to define only a sufficient number of tags needed for optimal or near-optimal data-object retrieval, as well as to facilitate other tag-associated data-object storage system tasks, including adding data objects to the tag-associated data-object storage system. FIG. 11 illustrates ramifications of the principles of embodiments of the present invention at a user-interface level. In FIG. 11, a user has selected a particular email 1102 to add to the tag-associated data-object storage system as a new data object. According to embodiments of the present invention, the tag-associated data-object storage system analyzes the selected recipient data object in order to automatically select one or more of the pre-existing tags most likely to be suitable candidates for association with the new data object 1104, similarly selecting a set of candidate groups for the new data object 1106 when data-object groups are supported. Again, note that groups need not be, and are preferably not, supported in many embodiments of the present invention, as discussed above. The groups button and associated candidate groups window 1106 may be entirely omitted from the user interface, in these cases. By automatically generating lists of candidate tags and groups, the tag-associated data-object storage system relieves the user of the burden of reading through the list of already-defined tags and groups in order to evaluate which tags to associate with new data objects and provides candidate tags that are appropriate by a well-defined new-data-object-to-already-stored-data-objects comparison method. with candidate tags being those tags associated with already stored data objects most similar to the new data object to be added to the tag-associated data-object storage system. Furthermore, according to the present invention, the user interface does not provide a simplified new-tag-definition feature during the data-object entry process that would enable a user to easily define new tags for the new data object. Of course, the user interface does provide sufficient features, such as add button III 0, to allow a user to define new tags at any point in time. However, by making the tag-definition process a separate step, the user interface encourages users to select tags from a list of pre-existing tags for association with new data objects, rather than casually or carelessly defining new tags for each new data object entered into the system.

Figure 12:
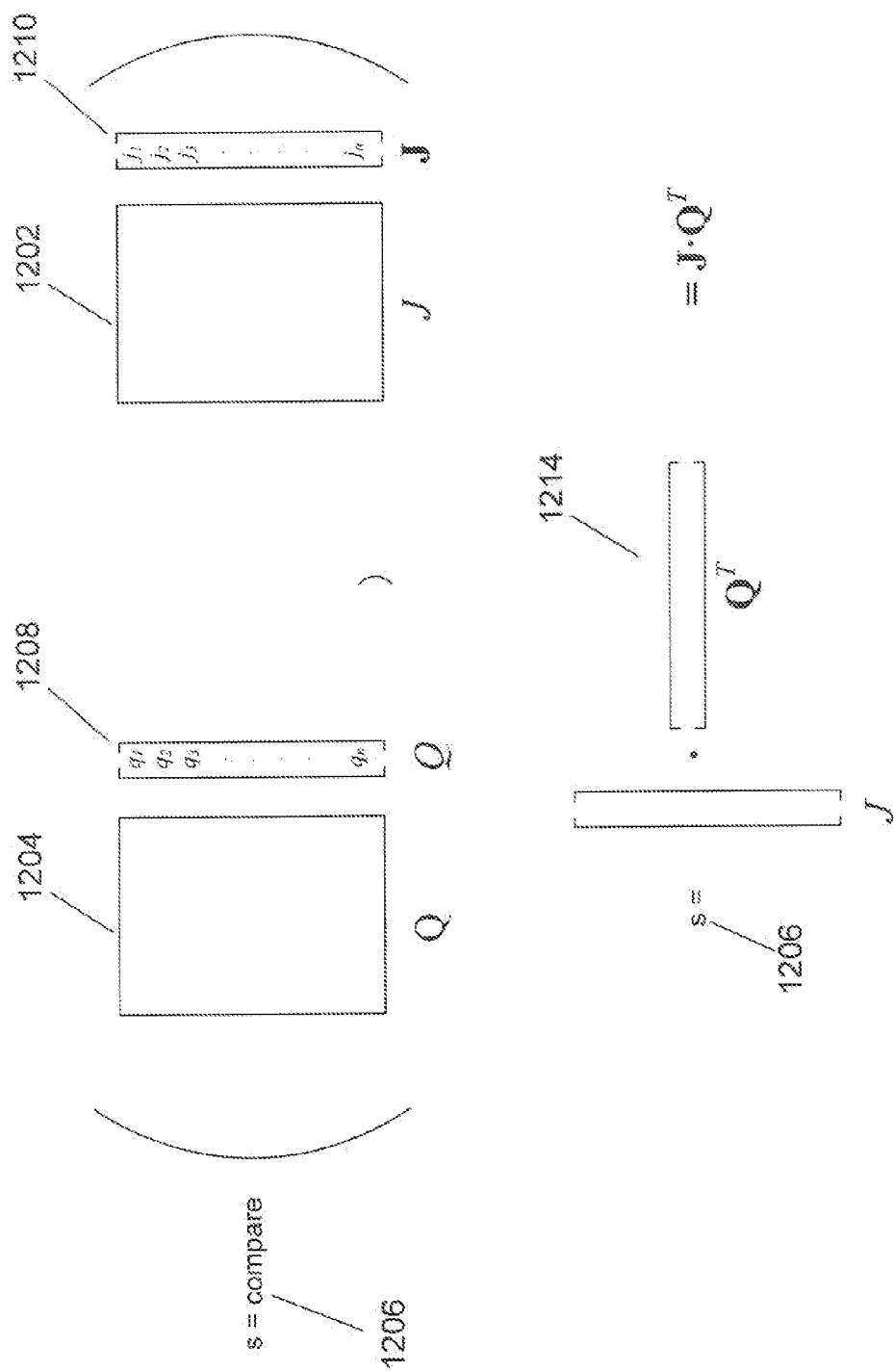
FIG. 12 illustrates a basic comparison operation by which two documents can be compared to produce a similarity metric.

FIG. 12 illustrates a basic comparison operation by which two documents can be compared to produce a similarity metric. In FIG. 12, data object J 1202 is compared to data object Q 1204 to generate a real-valued numeric similarity metric s 1206 that ranges from 0.0 to 1.0, with 0.0 indicating no similarity and 1.0 indicating that the two data objects are essentially identical. As discussed above, each data object is associated with a characteristic vector. Thus, data object Q 1204 is associated with characteristic vector Q 1208 and data object J 1202 is associated with characteristic vector J 1210. According to one embodiment of the present invention, the similarly metric s 1206 can be computed as the dot product of the characteristic vector J 1210 with the transpose of the characteristic vector Q, $Q^T$ 1214. Recall that characteristic vectors are normalized. When there is no similarity between the two data objects, the characteristic vectors are orthogonal, and the dot product produces the value "0." Conversely, when a data object is compared with itself, the two characteristic vectors are parallel, in a high-dimensional space, and therefore the dot product of the parallel normalized vectors is 1.0. In Euclidian two-dimensional space, $R^2$, a familiar formula for the dot product of two vectors is:

$$A \cdot B = |A||B|\cos\theta$$

where $\theta$ is the angle formed by placing the ends of the two vectors at a common point. In this case, $\cos\theta$ is equivalent to the similarity metric s, ranging from 0.0. for orthogonal vectors A and B, to 1.0, for parallel vectors A and B with lengths equal to 1.0.

Figure 13:
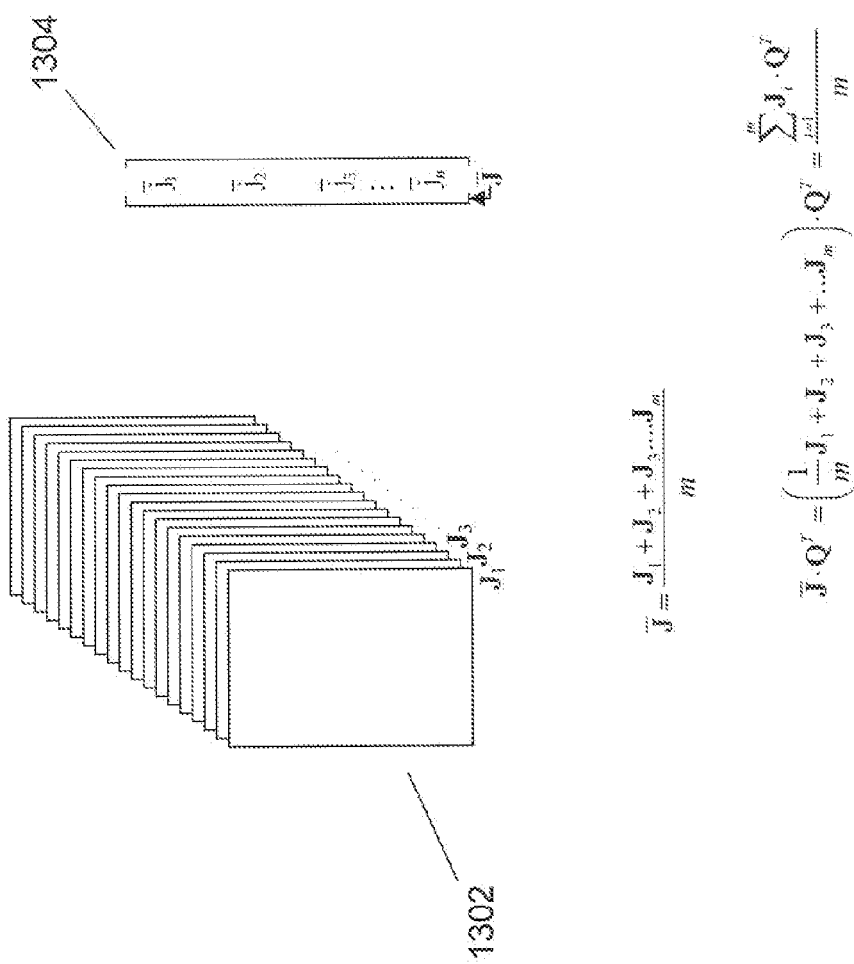
FIG. 13 illustrates a cumulative characteristic vector.

FIG. 13 illustrates a cumulative characteristic vector. As shown in FIG. 13, a collection of data objects $J_1, J_2, J_3, \ldots$ 1302 can be characterized by a single, cumulative characteristic vector 1304 that can be computed as the sum of the characteristic vectors of the individual data objects divided by the number of the data objects:

$$\overline{J} = \frac{J_1 + J_2 + J_3 \ldots, J_m}{m}$$

where m is the number of data objects, $J_1, J_2, \ldots$ are the characteristic vectors for the data objects, and J is the cumulative characteristic vector for the collection of data objects. The dot product of a characteristic vector of a new data object and a cumulative characteristic vector is equivalent to the average of the dot products of the characteristic vector for the new data object and each characteristic vector for each data object in a collection of data objects:

$$\overline{J} \cdot Q^T = \left(\frac{1}{m} J_1 + J_2 + J_3 + \ldots J_m\right) \cdot Q^T = \frac{\sum_{i=1}^{m} J_i \cdot Q^T}{m}$$

Thus, a data object can be compared to a collection of data objects by computing the dot product of the characteristic vector for the data object with the cumulative characteristic vector for the collection of data objects.

For comparing two data objects, or a data object to a group of data objects, associated with characteristic vectors J and Q, the dot-product of the two vectors $J \cdot Q^T$ provides a relatively straightforward approach to computing a similarity metric that reflects the similarity of the two data objects or of a data object to a group of data objects. However, to provide additional flexibility and adaptability in similarity-metric computation. one or both vectors J and Q may be first multiplied, in a Shur-product element-by-element multiplication, by weighting vectors to adjust the comparison:

$$s = (w_1 \odot J) \cdot (w_2 \odot Q^T)$$

where $\odot$ is a symbol for the Shur product; and
$w_1$ and $w_2$ are normalized weighting vectors with elements that range in value between 0 and 1, either or both of which are optional.

The weighting-vector multiplication essentially redistributes the significance of individual elements of the characteristic vectors, allowing particular aspects or elements to be emphasized or deemphasized.

FIGS. 14A-F illustrate, using graphs of discrete functions, a technique for selecting candidate tags for a data object according to one embodiment of the present invention. FIGS. 14A-F each show a graph in which computed similarity metrics s, obtained by comparison of a new data object to each of a number of single-tag-defined groups of data objects already stored in a tag-associated data-object storage system, are plotted with respect to the vertical axis 1402, with respect to the tag defining the corresponding group used in computing the similarity metric s, plotted with respect to the horizontal axis 1404. In other words, considering FIG. 14A, the plotted value 1406 is the similarity metric generated by comparing a new data object to a group of already stored data objects associated with tag 1408. In the process of selecting candidate tags, a new data object is compared against each group defined by an individual tag within a domain of the tag-associated data-object storage system into which the new data object is to be entered. Candidate tags are selected as tags that define groups that, when compared to the new data object, generate the highest similarity metrics. In the plots shown in FIGS. 14A-F, the tags defining groups are sorted in descending order with respect to the value of the similarity metrics generated by comparing a new data object to the groups.

In considering a plot of similarity metrics versus tags, as shown in FIGS. 14A-F, three different cases are possible. In a first case, shown in FIGS. 14A-B, the initial, high similarity-metric-value portion of the graph bows upward from a line (1410 in FIG. 14B) connecting the highest-valued similarity metric 1412 and the lowest-valued similarity metric 1414. In a second case, shown in FIGS. 14C-D, the initial portion of the graph is coincident with the line connecting the highest-valued similarity metric and the lowest-valued similarity metric. In a final case, illustrated in FIGS. 14E-F, the initial portion of the curve falls below the line connecting the highest-valued similarity metric with the lowest-valued similarity metric.

Figure 14A:
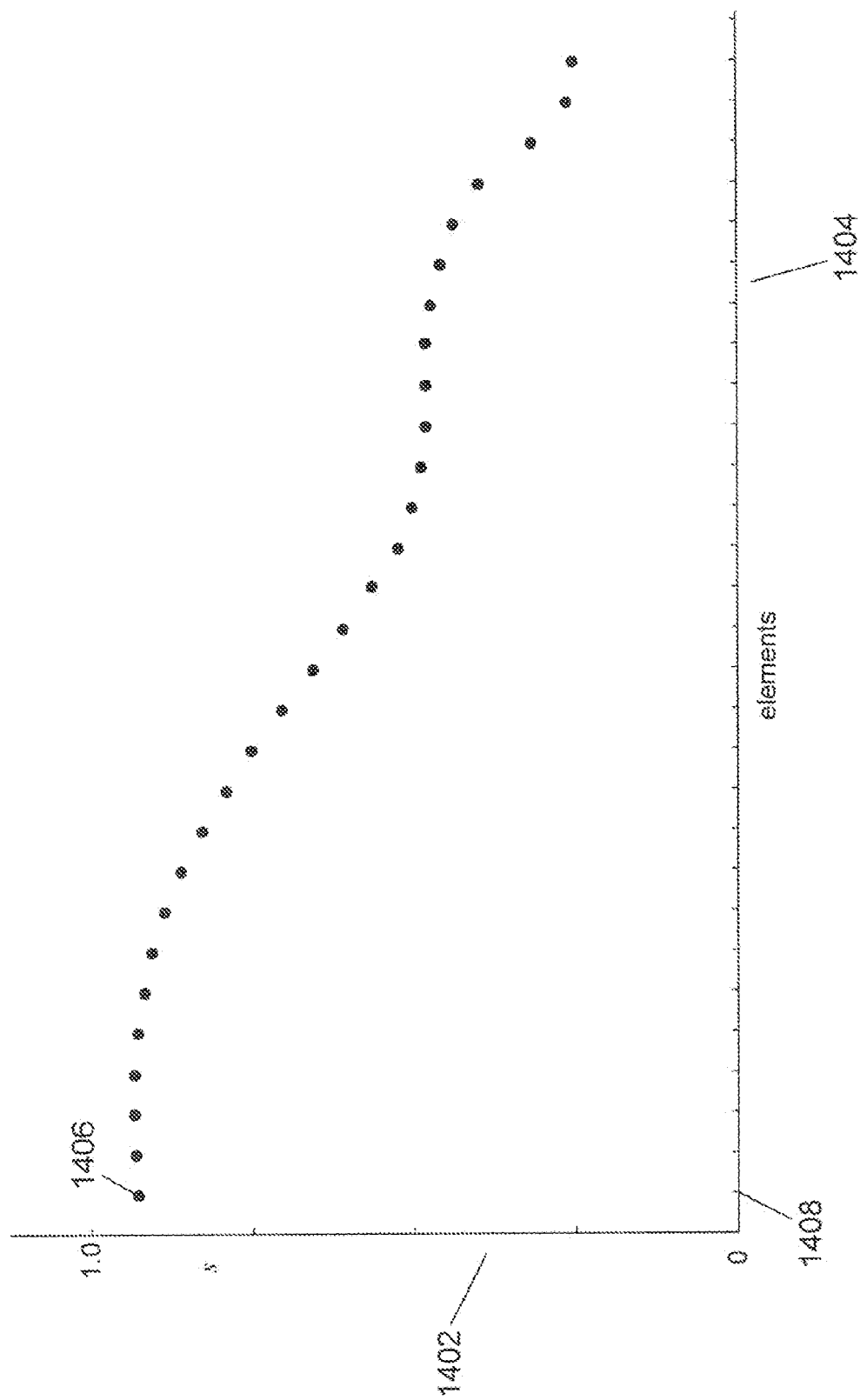
Figure 14B:
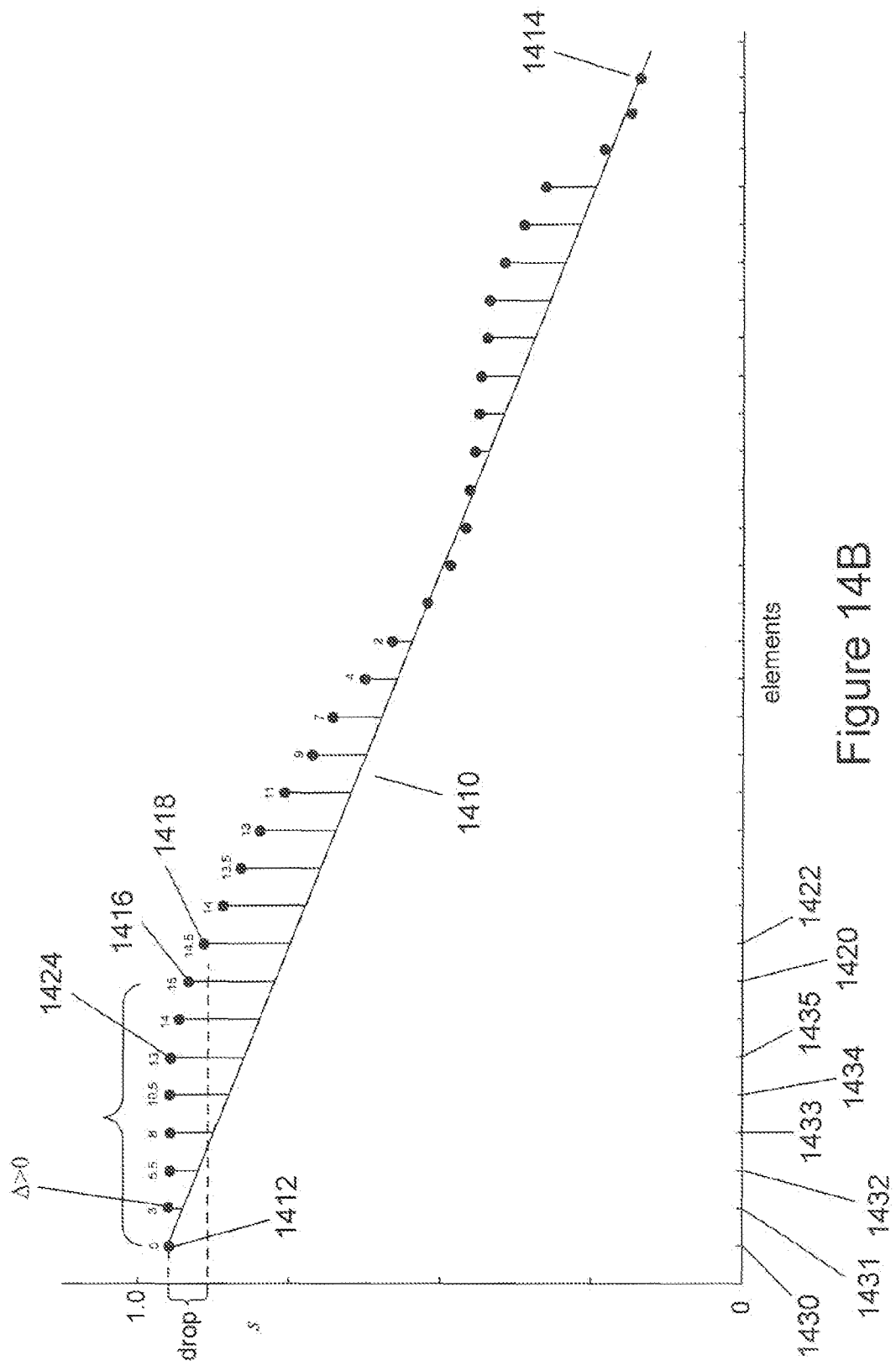

In the first case, illustrated in FIGS. 14A-B, one approach to selecting a set of candidate tags is to compute, for each plotted similarity metric following the first, highest-valued similarity metric 1412, a drop, in similarity-metric value, from the previously plotted similarity metric to the currently considered similarity-metric value. Because the initial computed drop is necessarily less than an average, overall drop computed as the total drop, from the highest-valued similarity metric 1412 to the lowest-valued similarity metric 1414 divided by the total number of computed drops, or the number of plotted similarity metrics minus one, a drop greater than the average drop must necessarily occur for at least one plotted similarity metric. In FIG. 14D, for example, the drop between plotted similarity metric 1416 and plotted similarity metric 1418, corresponding to tags 1420 and 1422, respectively, is greater than the average drop computed from the slope of line 1410. Plotted similarity metric 1416 corresponding to tag 1420 is then selected as an initial end point, and all preceding similarity metrics and corresponding tags comprise an initial set. In a next step, the average drop from the highest-valued similarity metric 1412 to the end point 1416 of the initial set is computed, and the highest-valued similarity metric 1412 and all successive similarity metrics with computed drops less than the average drop, which, in the example shown in FIG. 14B, includes the similarity metrics up through similarity metric 1424, are selected as a final set of similarity metrics. The tags corresponding to this final set of similarity metrics, 1430-1435 in FIG. 14B, are selected as the candidate tags that are suggested to a user for the new data object that was compared against to all of the groups of already-stored data objects defined by single tags.

Figure 14C:
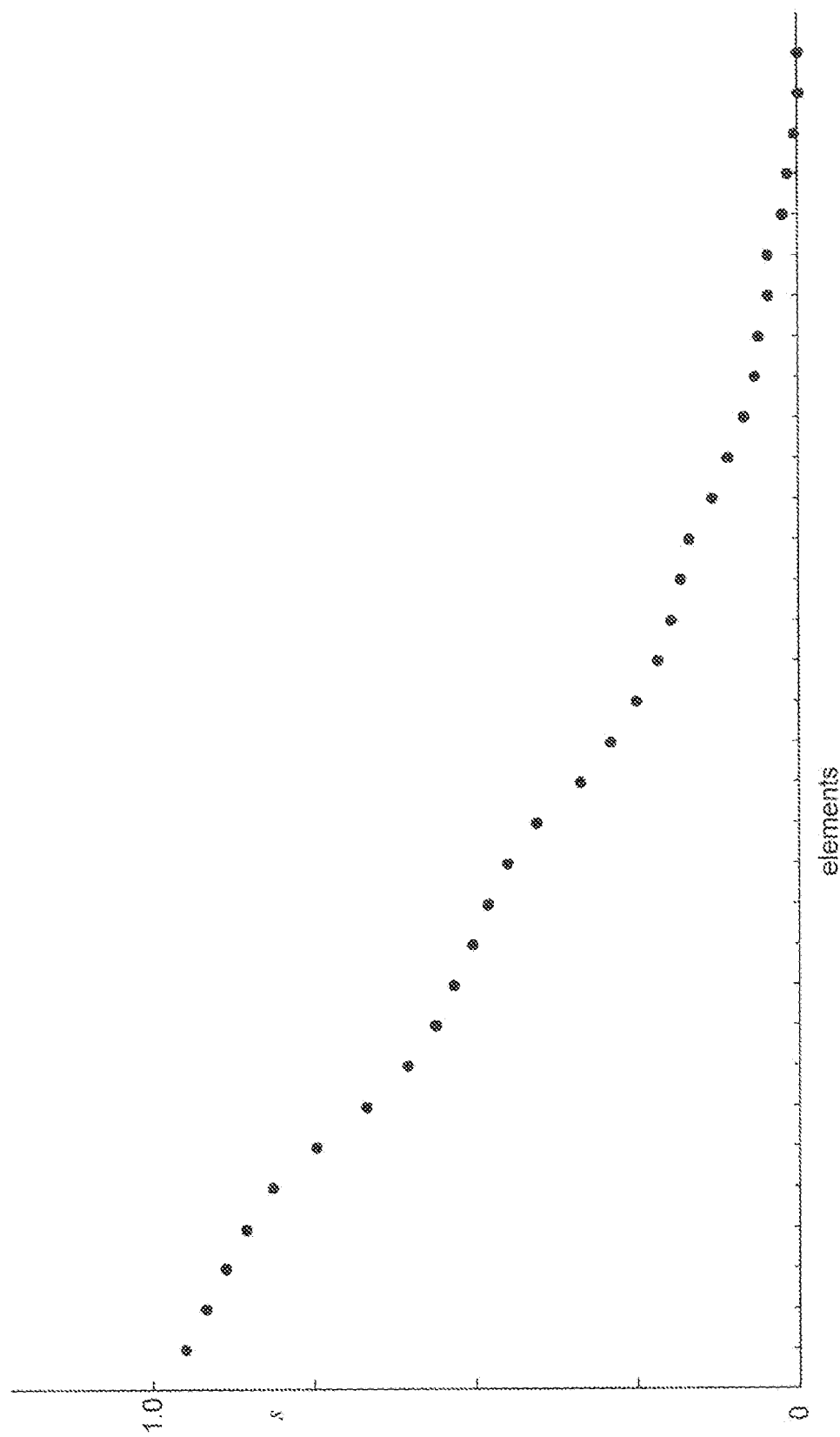
Figure 14D:
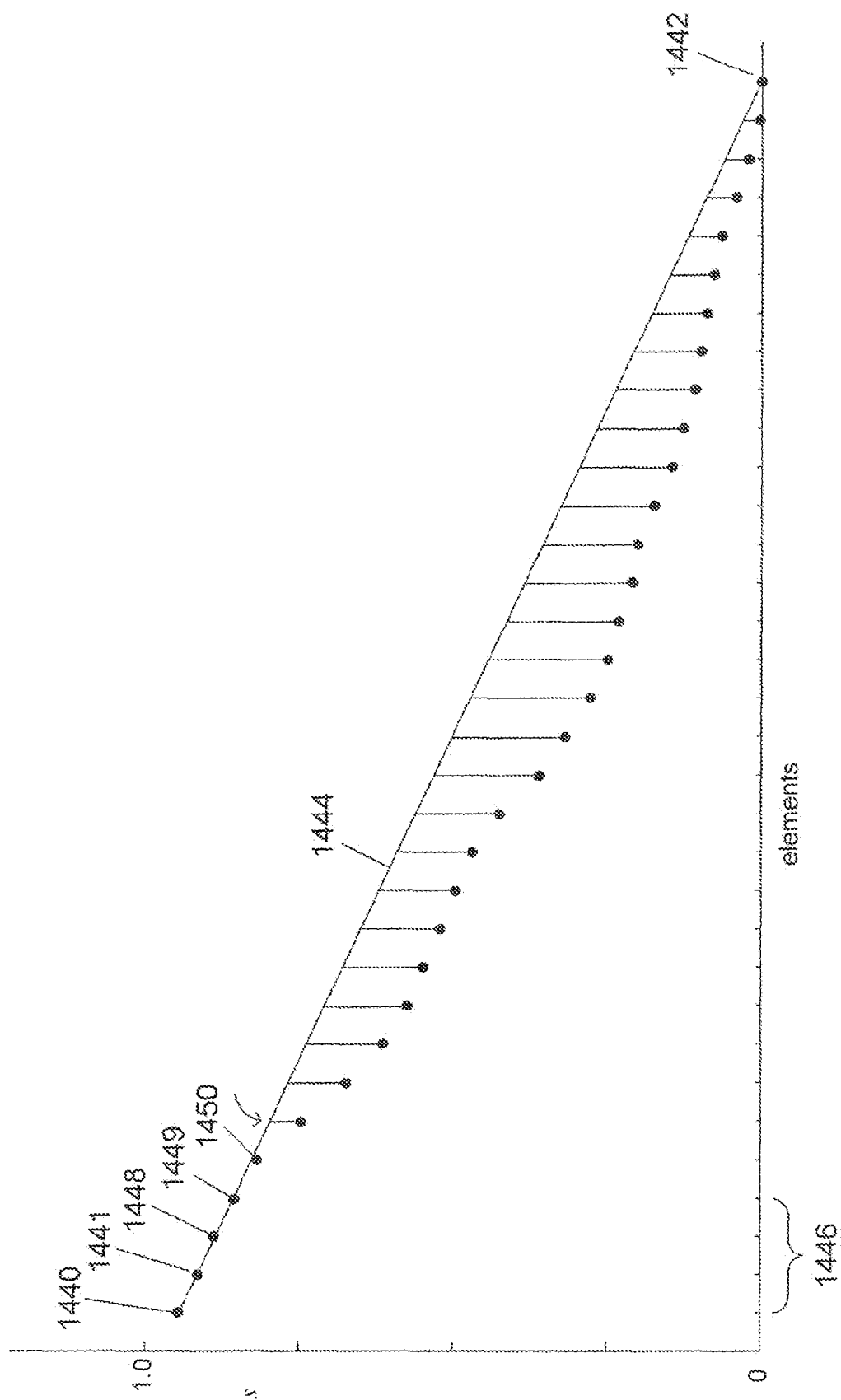

In the second case, shown in FIGS. 14C-D, the drop in similarity-metric value computed for the first pair of plotted similarity metrics 1440-1441 is equal to the average drop computed by dividing the total drop, from the highest-valued similarity metric 1440 to the lowest-valued similarity metric 1442 by the number of drops, or number of plotted similarity metrics minus one. In order to select a set of candidate tags, up to some maximum number, generally far smaller than the total number of possible candidate tags, the similarity metrics are considered, from the highest-valued similarity metric downward, until the computed drop in similarity-metric value is not equal to the average computed drop. In other words, were the maximum number of similarity metrics to fall along line 1444 connecting the highest-valued similarity metric 1440 with the lowest-valued similarity metric 1442, the tags corresponding to the maximum number of plotted similarity metric values of the highest-valued portion of the curve would be selected as a candidate-tag set. However, when the drop between two similarity metrics does not equal the computed average drop, then only a subset of the maximum number of allowable candidate tags is returned. In FIG. 14D, for example, given the maximum number of candidate tags is equal to six, only the four tags 1446 corresponding to the first four highest-valued similarity metrics 1440-1441 and 1448-1449 would be returned as candidate tags, since the drop between similarity metric 1449 and similarity metric 1450 is greater than the computed average drop.

Figure 14E:
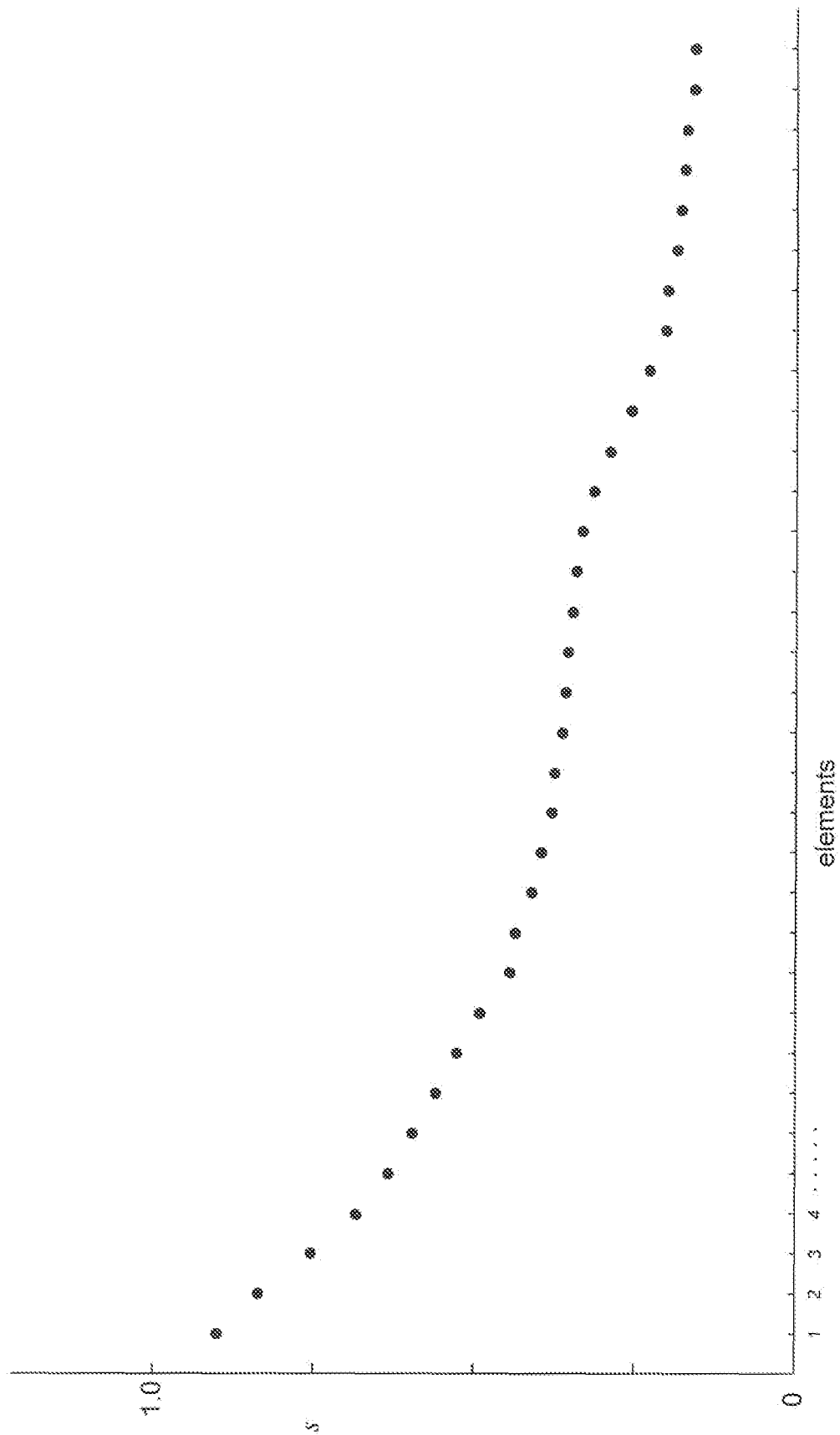

In the final case, illustrated in FIGS. 14E-F, a similar approach to that used in the first case is applied, with the sequence of drops computed for plotted similarity metrics followed until a drop less than the computed average drop is detected. The tags corresponding to these similarity metrics 1460 are taken as an initial set, and the average drop computed for the initial set. Then, a second, final set of candidate tags is selected by starting at the highest-valued similarity metric 1462 and proceeding to accept each successive similarity metric provided that the computed drop is greater than the average computed drop for the initial set. Tags corresponding to the final set are returned as candidate tags. In alternate embodiments, the final set may be decreased by half, since, in the third case, the initial highest-valued similarity metric is clearly the best candidate. In one embodiments of the present invention, only the tag corresponding to the topmost, highest-valued similarity metric is chosen as a single candidate tag.

The intent, for all three cases, is to select a small group of the best candidate tags. Many other alternative candidate-selection methods are possible, including always selecting the tag associated with the highest-valued similarity metric, always selecting the tags associated with a fixed number of highest-valued similarity metrics, when possible, or selecting all tags associated with similarity metrics above a threshold value. Selection of candidate groups is essentially identical to selection of candidate tags, with the exception that, in the case of selection of candidate tags, a new data object is compared against groups of already-stored data objects defined by single tags, while in the case of selection of candidate groups, the groups to which a new data object are compared are defined by two or more tags.

Figure 15:
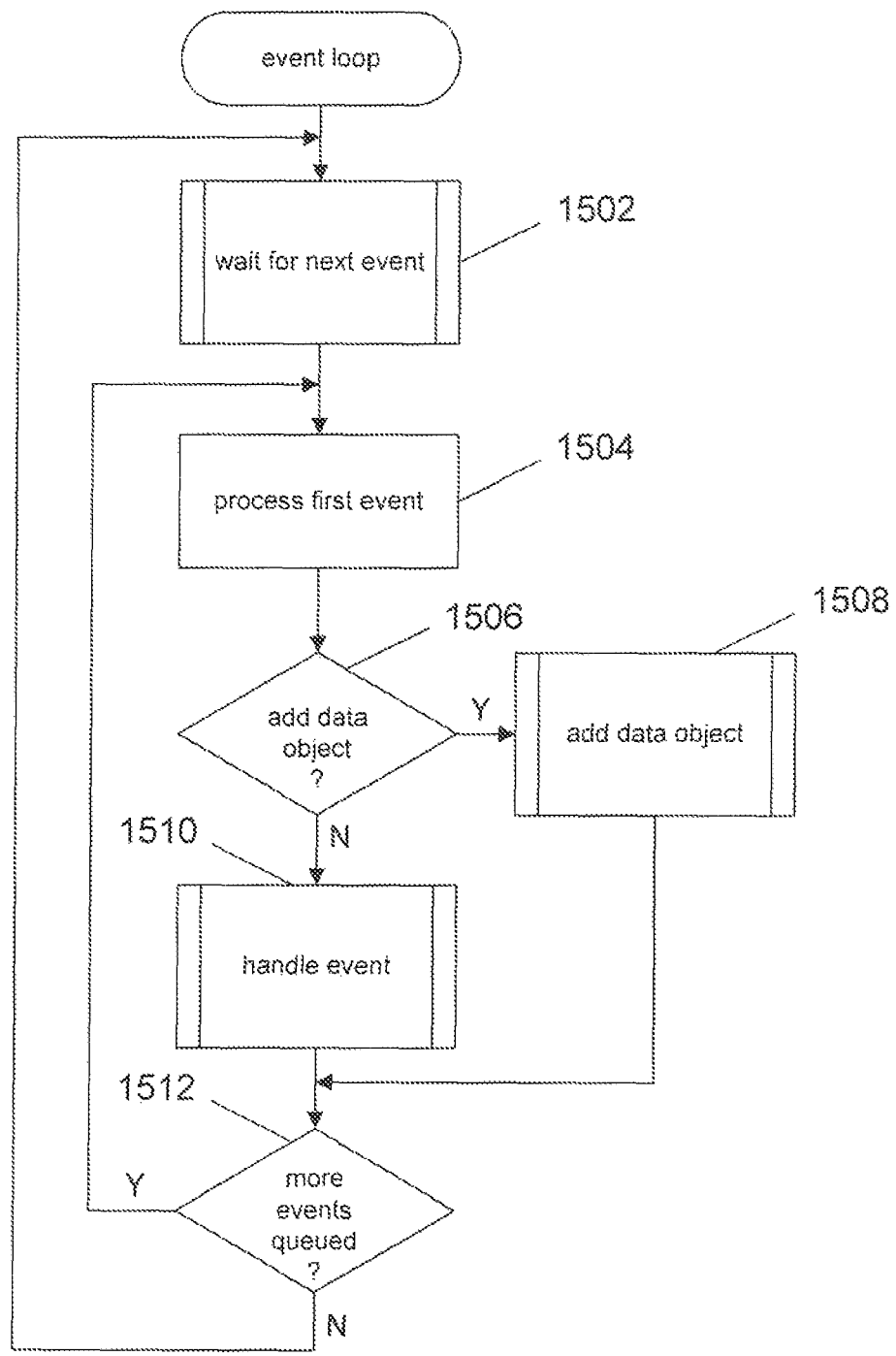
FIG. 15 shows a control-flow diagram for an event loop, running on a user computer, which underlies a user interface provided to the user by a tag-associated data-object storage system that represents one embodiment of the present invention.

Next, an implementation of tag and group suggestion methods that represent one embodiment of the present invention is provided. FIG. 15 shows a control-flow diagram for an event loop, running on a user computer, which underlies a user interface provided to the user by a tag-associated data-object storage system that represents one embodiment of the present invention. The event loop runs continuously, responding to events that occur as the user interacts with the tag-associated data-object storage system. In step 1502, the event loop waits for a next event to occur. When at least one event has occurred, control flows to step 1504, where the event loop dequeues the first event for processing from an event queue. If the event corresponds to a user invoking an add-new-data-object operation, as determined in step 1506, then an add-data-object routine is called in step 1508. Other events are handled by the generic event handler in step 1510. When there are more queued events to process, as determined in step 1512, the control flows back to step 1504. Otherwise, control flows back to step 1502, where the event loops waits for a next event to occur.

Figure 16:
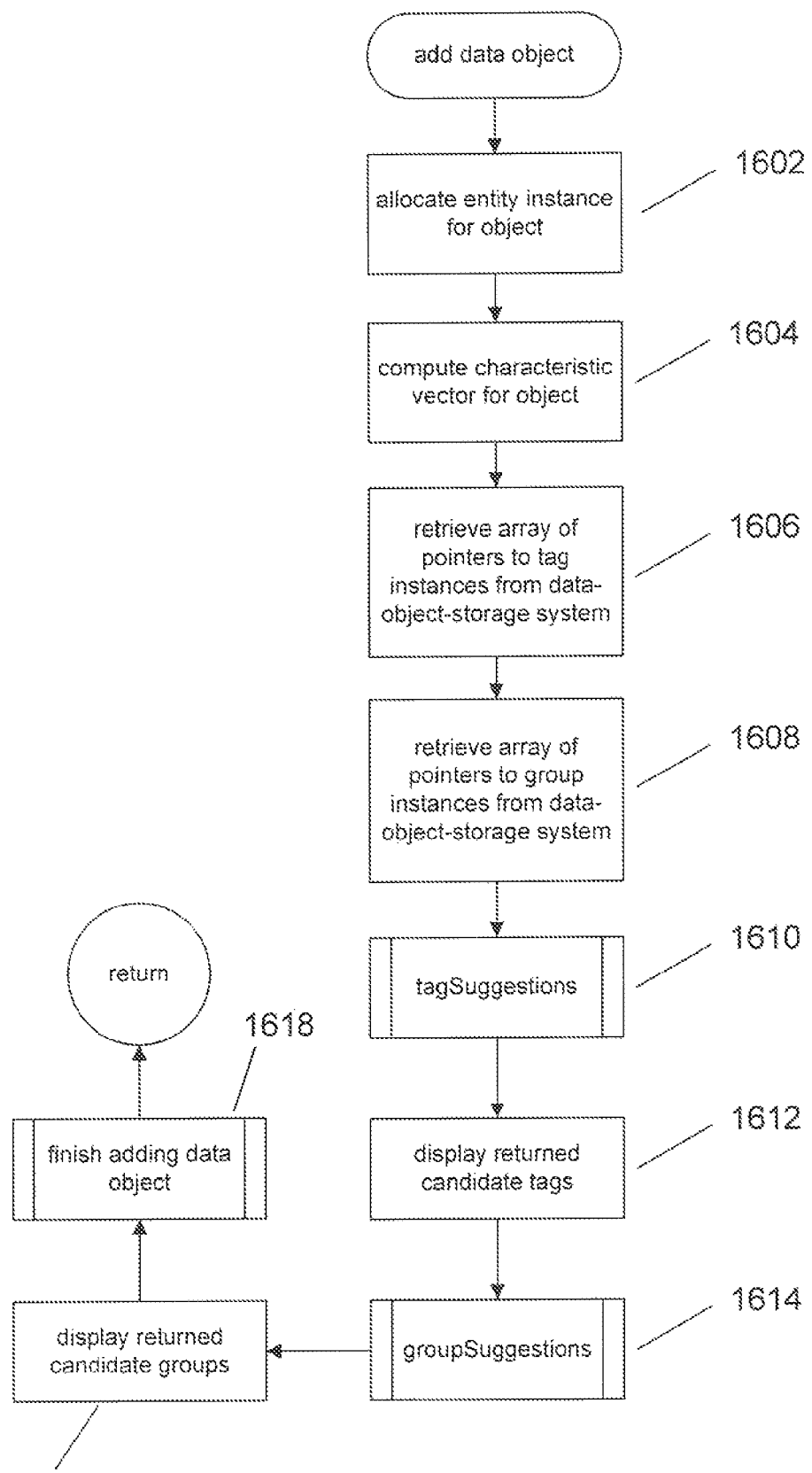
FIG. 16 is a control-flow diagram for the routine "addDataObject," called in step 1508 of FIG. 15 and representing one embodiment of the present invention.

FIG. 16 is a control-flow diagram for the routine "addDataObject," called in step 1508 of FIG. 15 and representing one embodiment of the present invention. In step 1602, the routine "addDataObject" allocates a new entity instance, discussed in greater detail below, for the new data object. In step 1604, the routine "addDataObject" computes a characteristic vector for the data object and stores the characteristic vector in the data-object storage system, placing a reference to the characteristic vector in the allocated entity instance. In step 1606, the routine "add data object" retrieves an array of pointers to instances of a class tag that represent all of the tags currently defined for the domain of stored data objects to which the new data object is to be stored. Similarly, in step 1608, an array of pointers to instances of a group class are retrieved from the data-object storage system, the instances of the class group representing all groups defined in the domain to which the new data object is to be added. In step 1610, the routine "addDataObject" invokes the routine "tagSuggestions" in order to select a set of candidate tags displayed to the user, as discussed above with reference to FIG. 11. In step 1612, the returned candidate tags are displayed to the user via the user interface. Similarly, in step 1614, the routine "groupSuggestions" is called to select a set of candidate groups to display to the user, as discussed above with reference to FIG. 11. In step 1616, the returned candidate groups are displayed to the user via the user interface. Finally in step 1618, the routine "finishAddingDataObject" is called to carry out additional tasks needed to store a new data object into the tag-associated data-object storage system. For example, tag and group selections made by the user are processed in order to associate a list of one or more tags with the new data object. The new data object is then physically stored, or, in certain cases, a reference to the data object is stored, in the tag-associated data-object storage system. The control-flow diagrams of FIGS. 15 and 16, and the pseudocode to follow, omit, in the interest of brevity, handling of various error conditions and other unusual events and occurrences that may be handled in a production tag-suggestion system incorporated into a production tag-associated data-object storage system.

Finally, a pseudocode implementation of the routines "tagSuggestions" and "groupSuggestions," called in steps 1612 and 1614 of FIG. 16, are provided.

First, a number of constants are declared:

```
1 const int MaxTagPerGroup = 5;
2 const int MAX_ELEMENTS = 2000;
3 const double Threshold = 0.00001;
4 const int MaxLinearMinusOne = 5;
```

The constant "MaxTagPerGroup" defines the maximum number of tags used to define a group. The constant "MAX_ELEMENTS" is a maximum number of tags or groups that can be defined for a particular domain of a tag-associated data-object storage system, according to one embodiment of the present invention. The constant "Threshold" is used in comparing similarity metrics obtained as dot products of characteristic vectors. The constant "MaxLinearMinusOne" is the maximum number of candidate tags that can be selected in the second case, described above with reference to FIGS. 14C-D.

Next, a number of basic classes are defined sufficiently to enable discussion of the tagSuggestions and groupSuggestions routines:

```
1  class vector;
2  class cmVector
3  {
4      public:
5          void add(vector &);
6          double operator * (vector &);
7          cmVector( );
8  };
9  class string;
10 class tag
11 {
12     private:
13         string name;
14         cmVector cV;
15     public:
16         double dot(vector* v) {return cV * (*v);};
17         void add(vector& v) {cV.add(v);};
18 };
19 typedef tag* tagPtr;
20 class group : public tag
21 {
22     private:
23         tagPtr tags[MaxTagPerGroup];
24         int numTags;
25
26     public:
27         int addTag(tag* t);
28         int deleteTag (tag* t);
29 };
30 typedef group* groupPtr;
31 class entity
32 {
33     private:
34         string name;
35         vector v;
36     public:
37         vector* getVector( ) {return &(v);};
38 };
39 typedef struct arrayElement {
40     tagPtr t;
41     double cValue;
42 } aElement;
43 typedef aElement* aElementPtr;
```

The classes include: (1) vector, declared on line 1, an instance of which is a characteristic vector for a data object; (2) cmVector, declared beginning on line 2, above, an instance of which is a cumulative characteristic vector discussed above with reference to FIG. 13; (3) string, a typical string class for storing names of tags and groups; (4) tag, an instance of which represents a user-defined tag within a tag-associated data-object storage system that represents one embodiment of the present invention; (5) group, an instance of which is a user-defined group stored in a tag-associated data-object storage system that represents one embodiment of the present invention; (6) entity, an instance of which represents a data object; and (7) arrayElement, instances of which are used for the accumulating computed similarity metrics and sorting tags or groups based on similarity-metric values.

Next, a comparison routine used by a quick-sort sorting function is provided:

```
1 int compare(const void* elem1, const void* elem2)
2 {
3     if (((aElement*)elem1)->cValue > ((aElement*)elem2)->cValue)
4         return -1;
5     else if (((aElement*)elem1)->cValue ==
6         ((aElement*)elem2)->cValue)
7         return 0;
8     else return 1;
9 }
```

This routine compares computed similarity metrics for two tags or groups as part of sorting tags and groups based on similarity-metric values.

Next, a routine used for comparison of similarity metrics is provided:

```
1 int compareScores (double a, double b)
2 {
3     if ((a - b) > Threshold) return 1;
4     else if ((a - b) < -Threshold) return -1;
5     else return 0;
6 }
```

The routine "compare Scores" compares two similarity metrics, a and b. When the difference between the two similarity metrics is less than or equal to the constant "Threshold," then the routine "compareScores" returns a value 0, indicating that the two similarity metrics are the same value. Otherwise, when a is greater than b, the value "1" is returned, and when b is greater than a, the value −1 is returned.

Next, the routine "curvePick" is provided:

```
1  int curvePick(aElementPtr p, double edrop, int sz, bool bowedUp)
2  {
3      int i, j, k, dir;
4      double drop, avgDrop;
5      for (i = 2, j = 1; i < sz; i++, j++)
6      {
7          drop = p[j].cValue - p[i].cValue;
8          dir = compareScores(drop, edrop);
9          if ((bowedUp && dir == 1) ||
10             (!bowedUp && dir == -1)) break;
11     }
12     avgDrop = (p[0].cValue - p[j].cValue) / j;
13     for (j = 1, k = 0; j < i; j++, k++)
14     {
15         drop = p[k].cValue - p[j].cValue;
16         dir = compareScores(drop, avgDrop);
17         if ((bowedUp && dir == 1) ||
18             (!bowedUp && dir == -1)) break;
19     }
20     if (!bowedUp) k = k / 2;
21     if (k < 1) return 1;
22     else return k;
23 }
```

This routine implements the tag or group candidate selection methods discussed above with reference to FIGS. 14A-B and 14E-F. A sorted list of instances of the class "arrayElement" are referenced by argument "p" and a computed average, or expected, drop in similarity metric value between successive tags or groups is provided by the argument "edrop." Argument "sz" indicates the number of tags or groups for which similarity metrics are provided in the array referenced by argument "p," and the Boolean argument "bowedUp" indicates which of the two cases discussed above with reference to FIGS. 14A-B and 14E-F is to be handled. In a first for-loop of lines 5-11, the computed similarity metrics are traversed, from highest-valued similarity metric to lowest-valued similarity metric, in order to determine when the drop between two successive similarity metrics is greater, for case 1, or lower, for case 3, than the expected drop. Upon completion of this for-loop, the iteration variable "j" indicates a last similarity metric in the initial set of similarity metrics, as discussed above with reference to FIGS. 14A-F. On line 12, the average drop in similarity-metric value over the initial set is computed, and in the far-loop of lines 13-19, the drops in similarity-metric values are again considered, for the initial set, in order to identify the first similarity metric for which the drop exceeds, in case 1, or falls below, in case 2, the computed average drop for the initial set. At the end of the second for-loop, the iteration variable "k" is set to the final tag or group in the final set of candidate tags or groups. In the third case, k is divided by 2, on line 20, to further decrease the number of candidate tags or groups.

Next, the function "linearPick" is provided:

```
1 int linearPick(aElementPtr p, double edrop, int sz)
2 {
3   int i, j;
4   double drop;
5   if (sz > MaxLinearMinusOne) sz = MaxLinearMinusOne;
6   for (i = 2, j = 1; i < sz; i++, j++)
7   {
8       drop = p[j].cValue - p[i].cValue;
9       if (!compareScores(drop, edrop)) return j;
10  }
11  return j;
12 }
```

This function traverses the computed similarity-metric values to identify a cutoff point for candidate tags, as discussed above with reference to FIGS. 14C-D. At most, a maximum number of candidates are selected equal to the constant MaxLinearMinusOne+1.

Next, the function "tagSuggestions" is provided:

```
1 int tagSuggestions (tagPtr* tags, int numTags, entity & e)
2 {
3   int i, j;
4   aElement buffer[MAX_ELEMENTS];
5   for (i = 0; i < numTags; i++)
6   {
7       buffer[i].t = (tags[i]);
8       buffer[i].cValue = tags[i]->dot(e.getVector( ));
9   }
10  qsort( (void *)buffer, (size_t)numTags,
11          sizeof(aElement), compare);
12  j = suggestions(buffer, numTags);
13  for (i = 0; i < j; i++)
14  {
15      tags[i] = buffer[i].t;
16  }
17  return j;
18 }
```

The function "tagSuggestions" receives an array of pointers to the user-defined tags, an indication of the number of user-defined tags, and a reference to a new data object that is to be added to a tag-associated data-object storage system that represents one embodiment of the present invention. In a for-loop of lines 5-9, the similarity metrics obtained by comparing the new data object to each group of already-stored data objects defined by a single tag are computed and stored in a buffer, along with a pointer to the tags. Then, on line 10, a quick-sort routine is called to sort the list of tags and associated similarity metrics in descending order by similarity-metric value. On line 12, the routine "suggestions" is called in order to select the candidate tags, and, in the for-loop of lines 13-16, the returned candidate tags are placed into the array referenced by the argument "tags."

Next, an implementation of the routine "suggestions" called in line 12 of the routine "tagSuggestions," is provided according to one embodiment of the present invention:

```
1 int suggestions(aElementPtr p, int num)
2 {
3   double edrop, fdrop;
4   int sz = num - 1;
5   if (num < 2) return num;
6   fdrop = p[0].cValue - p[1].cValue;
7   if (num == 2)
8   {
9       if (fdrop > 0.1) return 1;
10      else return 2;
11  }
12  edrop = (p[0].cValue - p[sz].cValue) / sz;
13  switch (compareScores(fdrop, edrop))
14  {
15      case -1: return (curvePick(p, edrop, sz, true));
16      case 1: return (curvePick(p, edrop, sz, false));
17      case 0: return (linearPick(p, edrop, sz));
18      default: return 0;
19  }
20 }
```

The routine "suggestions" computes a first drop in similarity-metric value, fdrop, as well as the computed average similarity-metric drop over the entire set of tags or groups, edrop, and uses these values to determine which of the three cases, discussed above with reference to FIGS. 14A-F, correspond to the input array of computed similarity-metric values associated with a set of tags or groups. Then, in the switch statement of lines 13-19, the appropriate function is called in order to select candidate tags or groups based on which case is detected.

Finally the routine "groupSuggestions" is provided:

```
1 int groupSuggestions (groupPtr* groups, int numGroups,
2                      entity & e)
3 {
4   return (tagSuggestions((tagPtr*)groups, numGroups, e));
5 }
```

The routine "groupSuggestions" is essentially identical to the routine "tagSuggestions."

In various embodiments of the present invention, thresholds are employed at various points in the tag-selection process. In the above implementation, for example, the constant "Threshold" determines a range about 0 in which the result of subtraction of two similarity metrics is considered to indicate that the two similarity metrics are essentially equal, in value. The threshold may need to dynamically vary, or need to be user-settable, since an appropriate threshold value may depend on the size, in elements, of characteristic vectors as well as the values generated for characteristic-vector elements for particular types of data objects. Additional thresholds may be used, including thresholds that define those tags suitable for selection, in various alternative embodiments of the present invention. These additional thresholds are, in general, both dynamic and can be specified directly by users, in many embodiments of the present invention. Certain of the tag-associated data-object storage systems that represent embodiments of the present invention automatically adjust thresholds to optimize system behavior, including optimizing the number of tags provided as suggestions for various types of data objects, or to optimize the relevance of tag suggestions, as measured by the frequency at which suggested tags are selected by users for describing data objects. In similar fashion, certain of the tag-associated data-object storage systems that represent embodiments of the present invention automatically adjust weights by which characteristic-vector elements are multiplied in order to adjust the relative significance of the elements with respect to the type of data object described by the characteristic vector.

Although the present invention has been described in terms of particular embodiments, it is not intended that the invention be limited to these embodiments. Modifications will be apparent to those skilled in the art. For example, method and system embodiments of the present invention for selecting candidate tags and groups for suggestion to users can be employed in a variety of different tag-associated data-object storage systems for a variety of different situations in addition to storing of new data objects. The tag-and-group suggestion methods that represent embodiments of the present invention can be implemented in any number of different programming languages in various ways by varying familiar programming and development parameters, including control structures selected, data structures used, modular organization, and other such parameters. While several different methods for tag and group candidate selection have been discussed, above, many additional techniques may be employed to select a relatively small number of tags or groups for suggestion to users. In all embodiments, a similarity metric is computed, by some means, in order to determine relative similarities of a data object to groups of data objects defined by tags in order to determine those tags that define groups of data objects having data contents with the most similarity to the data object being evaluated. Although characteristic vectors and dot products can be used, as discussed above, there are many other possible methods for computing similarity between data objects and groups of data objects based on the content of the data objects. Tag suggestions are often provided as part of the process by which a user adds data objects to a tag-associated data-object storage system, but may be provided in many other instances, including when lists of data objects are returned to users who access and retrieve data objects from the tag-associated data-object storage system. In any case where a data object or data-object identifier is displayed to a user, a set of suggested data tags may also be displayed, to provide context for the data object. Often, a user may associate additional tags with a data object even after the object has been added to a tag-associated data-object storage system, and tag suggestion can facilitate these tag associations subsequent to data-object addition.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A tag-suggestion system included as a component of a tag-associated data-object storage system that is implemented as one or more software programs, hardware circuits, or a combination of software programs and hardware circuits within one or more computer systems that include, or that access, one or more data-storage devices, the tag-suggestion system comprising:
   a set of defined tags stored in the tag-associated data-object storage system;
   tag-associated data objects stored in tag-associated data-object storage system;
   a comparator that compares a data object to other data objects stored in the tag-associated data-object storage system in order to determine those data objects stored in the tag-associated data-object storage system which are most similar to the data object for which tags are to be associated by carrying out a dot product operation on a characteristic vector that characterizes data contents of the data object for which tags are to be associated and a cumulative characteristic vector that characterizes cumulative data contents of the data objects associated with a particular tag, the dot product operation returning a numerically valued similarity metric, storing results of comparisons in the one or more data-storage devices; and
   a tag selector that selects tags associated with a number of data objects stored in tag-associated data-object storage system most similar to the data object for which tags are to be associated.

2. The tag-suggestion system of claim 1
   wherein the tag selector selects, as candidate tags, a number of tags associated with those data objects stored in the tag-associated data-object storage system most similar to the data object for which tags are to be associated;
   wherein the tag selector selects the candidate tags by
      for each of, or each of a subset of, the set of defined tags stored in the tag-associated data-object storage system,
         computing a similarity metric, by the comparator, by comparing the data object for which tags are to be associated to those data objects associated with a currently considered tag, and
         storing the computed similarity metric together with the currently considered tag in an electronic storage medium; and
      selecting, as a candidate tags, those tags associated with similarity metrics that indicate a greatest similarity between the data object for which tags are to be associated and data objects compared to the data object for which tags are to be associated to generate the similarity metrics; and
   wherein selecting, as a candidate tags, those tags associated with similarity metrics that indicate a greatest similarity between the data object for which tags are to be associated and data objects compared to the data object for which tags are to be associated to generate the similarity metrics further includes
      sorting the computed similarity metrics into a sorted list of similarity metrics;
      determining an average similarity-metric-value drop for successive similarity metrics in the sorted list of similarity metrics;
      determining whether a first similarity-metric drop computed from the first and second similarity metrics is greater than, equal to, or less than the average similarity-metric-value drop; and applying a first candidate-tag selection method when the first similarity-metric drop is greater than the average similarity-metric-value drop, a second candidate-tag-selection method when the first similarity-metric drop is equal to the average similarity-metric-value drop, or a third candidate-tag-selection method when the first similarity-metric drop is less than the average similarity-metric-value drop.

3. The tag-suggestion system of claim 2 wherein the first, second, and third candidate-tag-selection methods analyze a function of similarity metrics with respect to tags to determine when a turning point occurs in the function, and selects those tags associated with similarity metrics with values above the similarity metric of the turning point.

4. The tag-suggestion system of claim 1 wherein, prior to carrying out the dot product operation on a characteristic vector that characterizes data contents of the data object for which tags are to be associated and a cumulative characteristic vector that characterizes cumulative data contents of the data objects associated with a particular tag, the comparator multiplies one or more elements of the characteristic vector by weights, in order to adjust the relative significance of the characteristic-vector elements.

5. The tag-suggestion system of claim 4 wherein the comparator multiplies one or more elements of the characteristic vector by weights that are computed based on a type of the data object.

6. A method, carried out in a tag-associated data-object storage system that is implemented as one or more software programs, hardware circuits, or a combination of software programs and hardware circuits within one or more computer systems that include, or access, one or more data-storage devices, the method comprising:

comparing, by a comparator, a data object to other data objects stored in the tag-associated data-object storage system in order to determine those data objects stored in the tag-associated data-object storage system which are most similar to the data object for which tags are to be associated by carrying out a dot product operation on a characteristic vector that characterizes data contents of the data object for which tags are to be associated and a cumulative characteristic vector that characterizes cumulative data contents of the data objects associated with a particular tag, the dot product operation returning a numerically valued similarity metric, storing results of comparisons in the one or more data-storage devices;

selecting, by a tag selector, tags associated with a number of data objects stored in tag-associated data-object storage system most similar to the data object for which tags are to be associated.

7. The method of claim 6 wherein the tag selector selects, as candidate tags, a number of tags associated with those data objects stored in the tag-associated data-object storage system most similar to the data object for which tags are to be associated;

wherein the tag selector selects the candidate tags by for each of, or each of a subset of, the set of defined tags stored in the tag-associated data-object storage system, computing a similarity metric, by the comparator, by comparing the data object for which tags are to be associated to those data objects associated with a currently considered tag, and storing the computed similarity metric together with the currently considered tag in an electronic storage medium; and selecting, as a candidate tags, those tags associated with similarity metrics that indicate a greatest similarity between the data object for which tags are to be associated and data objects compared to the data object for which tags are to be associated to generate the similarity metrics; and wherein selecting, as a candidate tags, those tags associated with similarity metrics that indicate a greatest similarity between the data object for which tags are to be associated and data objects compared to the data object for which tags are to be associated to generate the similarity metrics further includes sorting the computed similarity metrics into a sorted list of similarity metrics;

determining an average similarity-metric-value drop for successive similarity metrics in the sorted list of similarity metrics;

determining whether a first similarity-metric drop computed from the first and second similarity metrics is greater than, equal to, or less than the average similarity-metric-value drop; and applying a first candidate-tag selection method when the first similarity-metric drop is greater than the average similarity-metric-value drop, a second candidate-tag-selection method when the first similarity-metric drop is equal to the average similarity-metric-value drop, or a third candidate-tag-selection method when the first similarity-metric drop is less than the average similarity-metric-value drop.

8. The method of claim 7 wherein the first, second, and third candidate-tag-selection methods analyze a function of similarity metrics with respect to tags to determine when a turning point occurs in the function, and selects those tags associated with similarity metrics with values above the similarity metric of the turning point.

* * * * *